United States Patent
Newell et al.

(10) Patent No.: US 12,359,479 B2
(45) Date of Patent: Jul. 15, 2025

(54) HOOK LATCH WITH ADJUSTABLE THROW

(71) Applicant: QRP, Inc., Berea, OH (US)

(72) Inventors: Joseph B. Newell, Oak Island, NC (US); Michael J. Parsell, Jr., Wilmington, NC (US)

(73) Assignee: QRP, Inc., Berea, OH (US)

( * ) Notice: Subject to any disclaimer, the term of this patent is extended or adjusted under 35 U.S.C. 154(b) by 2 days.

(21) Appl. No.: 18/118,739

(22) Filed: Mar. 7, 2023

(65) Prior Publication Data
US 2023/0250682 A1 Aug. 10, 2023

Related U.S. Application Data

(63) Continuation-in-part of application No. 15/268,613, filed on Sep. 18, 2016, now Pat. No. 11,597,529, and
(Continued)

(51) Int. Cl.
*E05C 19/14* (2006.01)
*B64D 29/06* (2006.01)

(52) U.S. Cl.
CPC ............ *E05C 19/145* (2013.01); *B64D 29/06* (2013.01)

(58) Field of Classification Search
CPC ....... B64D 29/06; B64D 29/08; E05C 19/145; E05C 19/14; E05C 19/10; E05C 1/065;
(Continued)

(56) References Cited

U.S. PATENT DOCUMENTS 2,695,803 A 11/1954 Mills
2,714,032 A 7/1955 Mills
(Continued)

FOREIGN PATENT DOCUMENTS

DE 2828033 6/1978
EP 0206648 12/1986
(Continued)

OTHER PUBLICATIONS

Translation of the first Office Action from China. 201680046571.6. Nov. 15, 2018.
(Continued)

*Primary Examiner* — Mark A Williams
(74) *Attorney, Agent, or Firm* — Harness, Dickey & Pierce, P.L.C.

(57) ABSTRACT

A latch is operable between a disengaged position and an engaged position releasably connecting a latch mounting pin on a first static structural element to a keeper on a second, movable structural element. The latch includes means for adjusting the throw of the hook to accommodate different distances between the latch mounting pin and the keeper due to manufacturing tolerances or different applications. The latch has a tension mechanism, a hook connected to the tension mechanism, and a handle pivotably connected to the tension mechanism and operable to actuate the tension mechanism between engaged and disengaged positions with the keeper. The latch is operable between the engaged and disengaged positions by rotating the handle between a closed position and an open position.

20 Claims, 21 Drawing Sheets

Related U.S. Application Data a continuation-in-part of application No. 14/733,412, filed on Jun. 8, 2015, now Pat. No. 10,173,782, said application No. 15/268,613 is a continuation-in-part of application No. 14/733,412, filed on Jun. 8, 2015, now Pat. No. 10,173,782, which is a continuation-in-part of application No. 14/657,373, filed on Mar. 13, 2015, now abandoned.

(60) Provisional application No. 61/952,521, filed on Mar. 13, 2014.

(58) Field of Classification Search
CPC ......... Y10T 292/0917; Y10T 292/0871; Y10T 292/089; Y10T 292/54; Y10S 292/31; Y10S 292/49
See application file for complete search history.

(56) References Cited

U.S. PATENT DOCUMENTS

| | | | |
|---|---|---|---|
| 2,873,495 A * | 2/1959 | Love | E05C 19/145 |
| | | | 292/DIG. 31 |
| 2,904,141 A * | 9/1959 | Henrichs | B64D 29/06 |
| | | | 292/108 |
| 2,927,812 A | 3/1960 | Smith | |
| 3,021,162 A * | 2/1962 | Jahn | E05C 19/14 |
| | | | 411/537 |
| 3,259,412 A | 7/1966 | Wheeler | |
| 4,053,177 A | 10/1977 | Stammreich et al. | |
| 4,602,812 A * | 7/1986 | Bourne | E05C 19/145 |
| | | | 292/DIG. 60 |
| 4,743,052 A | 5/1988 | Stammreich et al. | |
| 4,768,815 A | 9/1988 | Harmon | |
| 4,858,970 A | 8/1989 | Tedesco | |
| 5,213,286 A | 5/1993 | Elliott | |
| 5,295,604 A | 3/1994 | Van Ryswyk | |
| 2,703,431 A | 3/1995 | Tatom | |
| 5,620,212 A | 4/1997 | Bourne et al. | |
| 5,915,765 A | 6/1999 | Sternberger | |
| 5,984,382 A | 11/1999 | Bourne | |
| 6,036,238 A | 3/2000 | Lallament | |
| 6,279,971 B1 | 8/2001 | Dessenberger | |
| 6,325,428 B1 | 12/2001 | Do | |
| 6,343,815 B1 | 2/2002 | Poe | |
| 6,382,690 B1 * | 5/2002 | Dessenberger, Jr. | E05B 41/00 |
| | | | 292/113 |
| 7,461,871 B2 | 12/2008 | Vauchel | |
| 7,988,208 B2 | 8/2011 | Zugaza Fernandez | |
| 8,864,185 B2 * | 10/2014 | Do | E05C 19/145 |
| | | | 292/DIG. 60 |
| 8,864,189 B2 | 10/2014 | Fournie et al. | |
| 8,925,979 B2 | 1/2015 | Hernandez | |
| 9,452,845 B2 | 9/2016 | Renault | |
| 9,567,784 B2 * | 2/2017 | Defrance | E05C 19/145 |
| 9,677,306 B2 | 6/2017 | DeFrance | |
| 10,137,996 B2 * | 11/2018 | Mellor | B64D 29/06 |
| 10,173,782 B2 | 1/2019 | Hernandez | |
| 10,392,830 B2 * | 8/2019 | Helsley | E05B 27/083 |
| 10,443,279 B2 | 10/2019 | Kim et al. | |
| 10,760,304 B2 * | 9/2020 | Do | E05C 19/145 |
| 11,002,046 B2 | 5/2021 | Kim et al. | |
| 11,041,331 B2 | 6/2021 | Do | |
| 11,193,305 B2 | 12/2021 | Helsley et al. | |
| 11,668,124 B2 | 6/2023 | McMahan et al. | |
| 11,773,622 B2 | 10/2023 | Helsley et al. | |
| 12,006,050 B2 | 6/2024 | Aguilar Ante et al. | |
| 12,012,790 B2 | 6/2024 | Almaraz et al. | |
| 2006/0061108 A1 | 3/2006 | Meineke | |
| 2006/0214431 A1 | 9/2006 | Helsley | |
| 2008/0129056 A1 | 6/2008 | Hernandez et al. | |
| 2010/0026482 A1 | 2/2010 | Grichener | |
| 2013/0328326 A1 * | 12/2013 | DeFrance | E05C 19/10 |
| | | | 292/114 |
| 2015/0259957 A1 | 9/2015 | Hernandez | |
| 2017/0101811 A1 * | 4/2017 | Parsell, Jr. | E05C 19/145 |
| 2022/0120115 A1 | 4/2022 | Helsley | |
| 2022/0194612 A1 | 6/2022 | McMahan et al. | |
| 2023/0250682 A1 | 8/2023 | Newell | |
| 2024/0159087 A1 | 5/2024 | Shivarudrappa et al. | |

FOREIGN PATENT DOCUMENTS

| | | |
|---|---|---|
| FR | 981093 A | 5/1951 |
| FR | 2458657 | 6/1984 |
| WO | 2009009732 | 1/2009 |

OTHER PUBLICATIONS

International Search Report and Written Opinion of the International Search Authority, PCT/US16/36446, Sep. 9, 2016.
International Search Report and Written Opinion of the International Search Authority, PCT/US17/51980, Dec. 1, 2017.
European Search Report, Nov. 18, 2015, Publisher: European Patent Office, Published in European Patent Office.

* cited by examiner

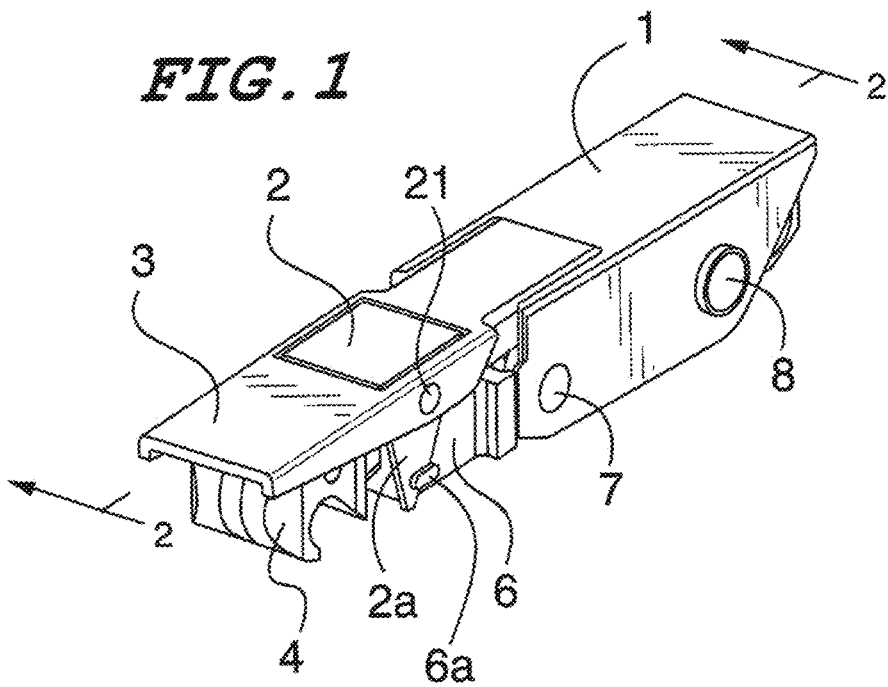
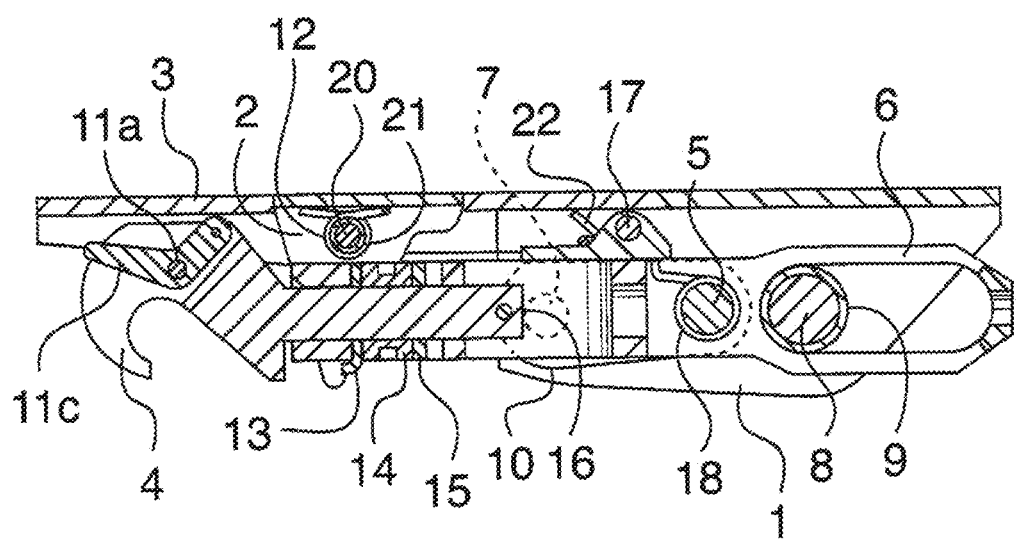

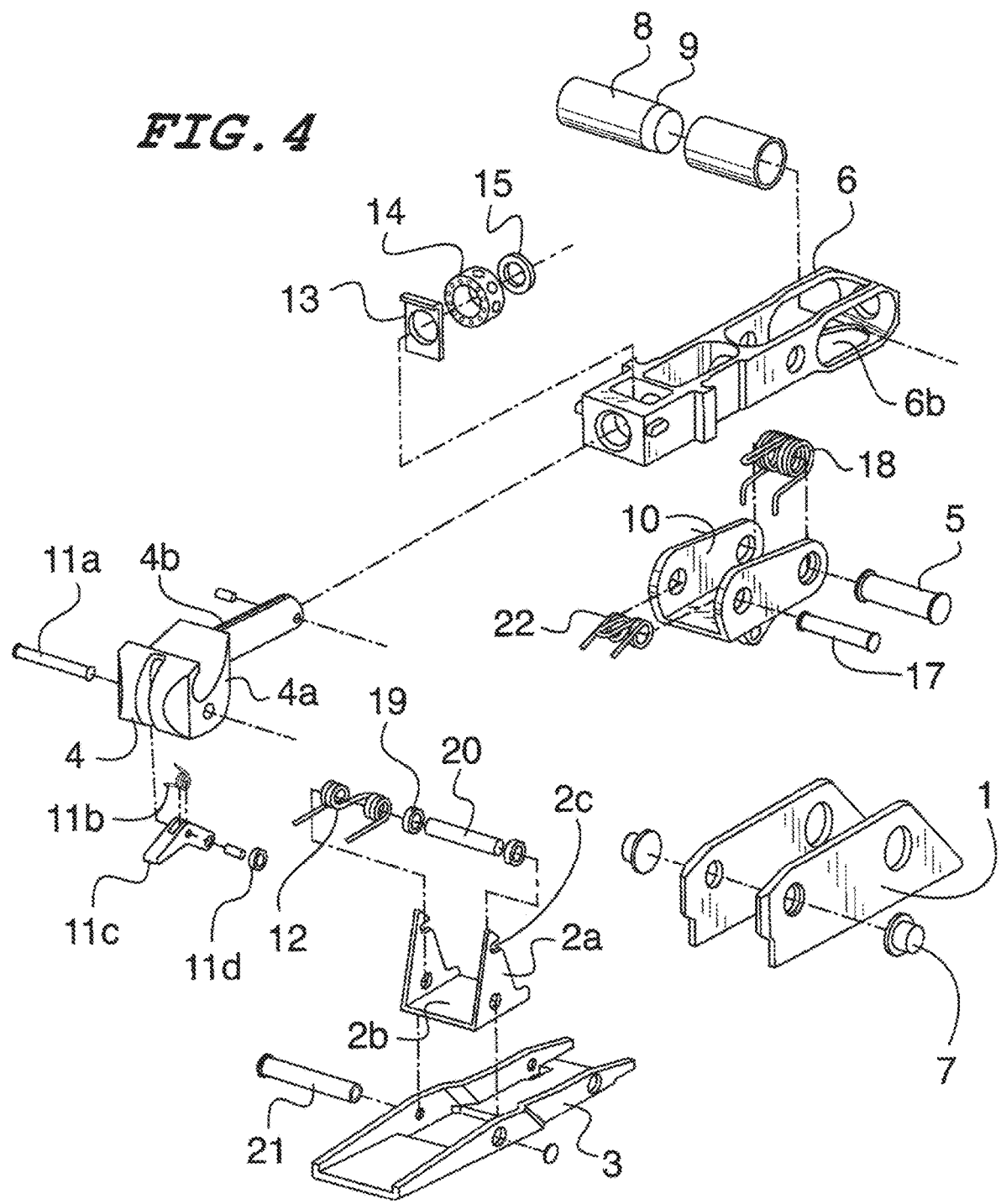

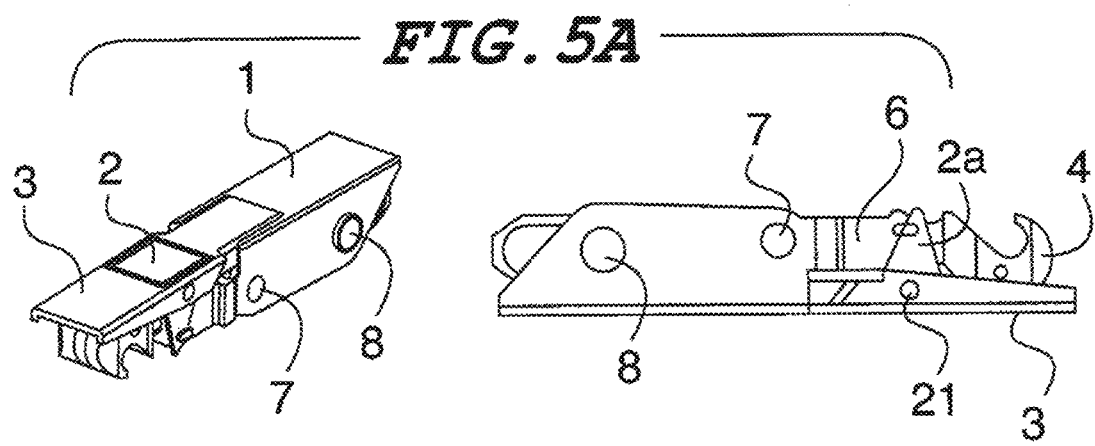
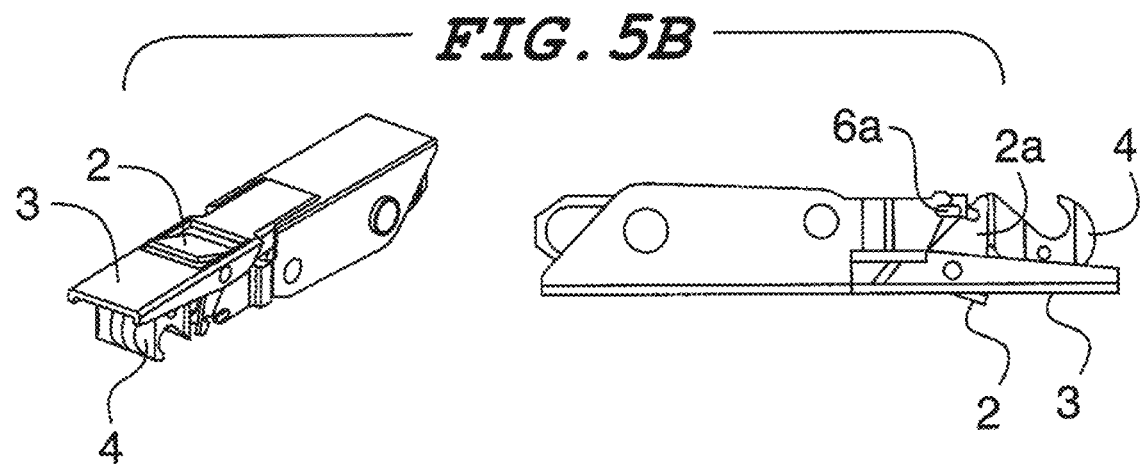
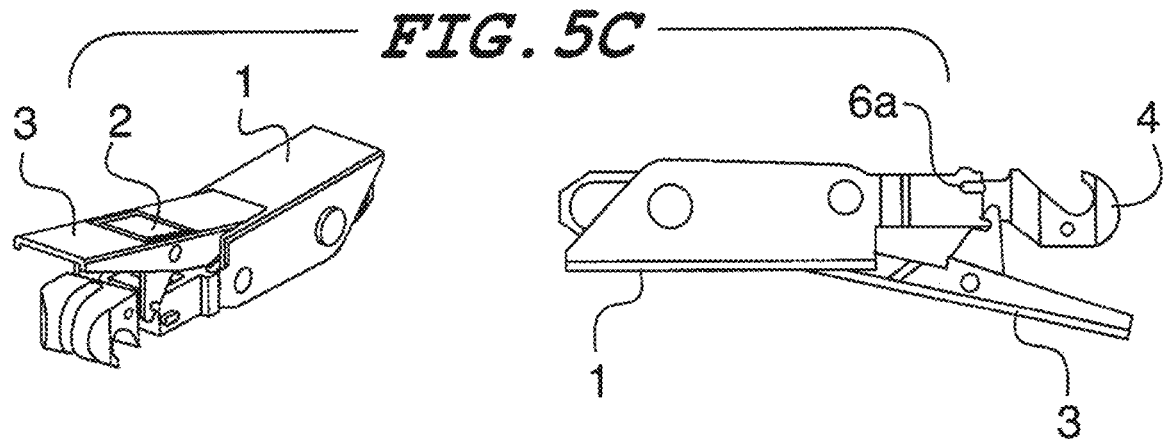

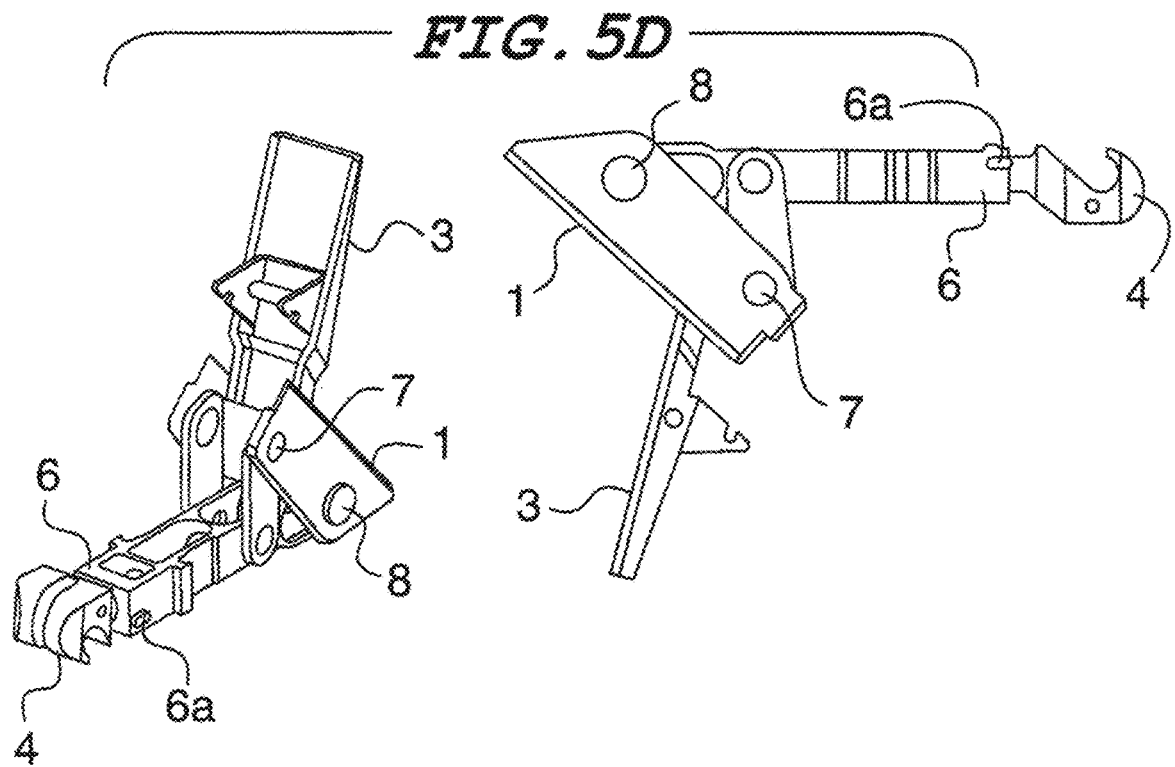
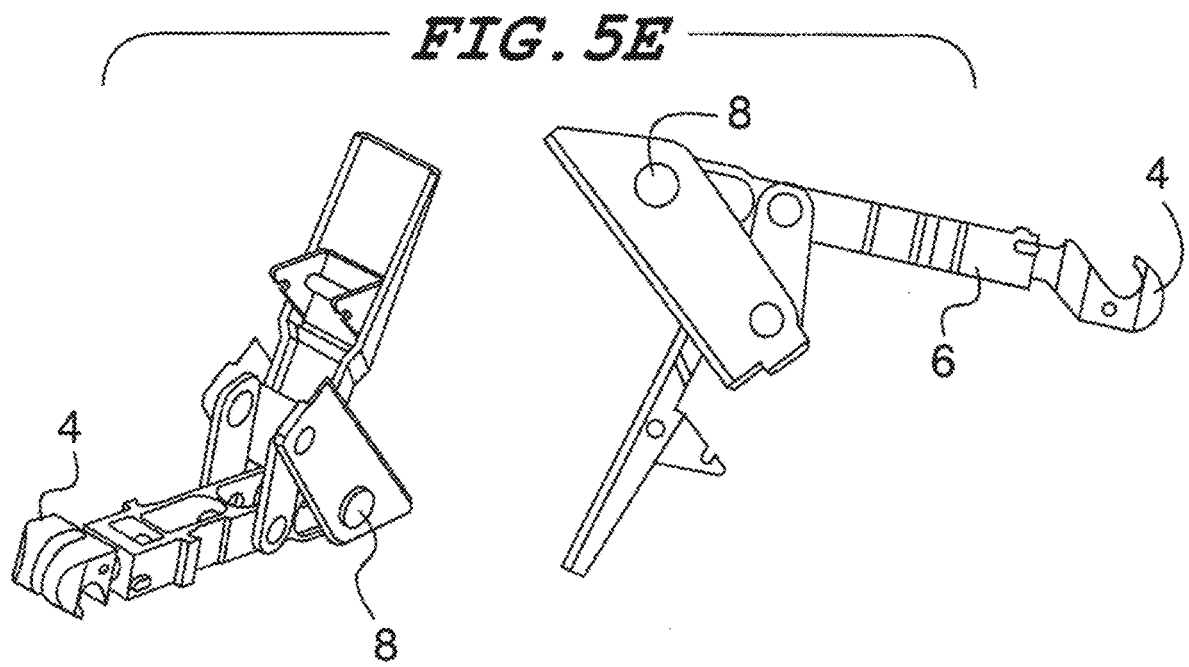

HOOK LATCH WITH ADJUSTABLE THROW

CROSS-REFERENCE TO RELATED APPLICATIONS

This is a continuation-in-part application of U.S. application Ser. No. 15/268,613 filed Sep. 18, 2016 entitled Safety Hook Latch, which is a continuation-in-part application of U.S. application Ser. No. 14/733,412 filed Jun. 8, 2015 entitled "Toggle Link Latch", which is continuation-in-part of U.S. patent application Ser. No. 14/657,373 filed Mar. 13, 2015 entitled "Toggle Link Latch", which is a non-provisional patent application of provisional application No. 61/952,521 filed Mar. 13, 2014 entitled "Toggle Link Latch", priority from all of which is hereby claimed.

FIELD OF THE INVENTION

The present invention relates to a hook latch, which connects a first structural element to a keeper on a second structural element on, for example, aircraft panels. More specifically, the invention relates to a hook latch having means for adjusting the throw of the hook to accommodate different distances between the latch mounting pin and the keeper.

BACKGROUND OF THE INVENTION

A wide variety of latching mechanisms for use in aircraft exists in the prior art because aircraft have many components, such as fuselage panels including cowlings and the like, which must be opened and closed very securely. For example, tension hook latches mounted on one panel cinch to a keeper on a second panel to hold the movable panels closed. Other latches include sliding toggle linkages to minimize the kinematic envelope of the latch. These linkages rotate around a mounting pin to produce the latch reach. The complexity of quality aircraft latches makes them relatively large and heavy. Since every component of an aircraft should be as light as possible, it would be desirable to provide a quality latch having a reduced size and weight compared to the prior art.

One way to reduce the weight of the latch is by reducing the number of components latching mechanisms require to function. By integrating the keeper component function into a tension latch, the number of parts can be reduced, thus reducing the weight of the configuration.

To reduce weight, aircraft panels are relatively thin, which translates to an associated reduction in sturdiness. As a result, the aircraft panels, and other structures to which the above-described latches are attached, are delicate and can be easily damaged. For example, with some prior art latches, the free end of an open latch may obstruct an opening defined by a movable panel for which the latch is provided. Therefore, when closing the movable panel, it may strike the latch and be damaged if the latch is not properly retracted. This problem is often encountered with open overhead panels where gravity biases the latch assembly in the closed direction, thereby orienting the hook in an extended position pointing upwardly. This configuration occurs if the center of gravity of the latch is "behind" (in the direction away from the hook) the pivot point of the panel-mounting pin. If this occurs, the hook end of the latch could be jammed against the edge of the mating substructure if the latch is not first pulled away before attempting to close the panel. This weight distribution problem is often solved by adding "dead" weight to the hook end of the latch so that it hangs downward, away from the opening, and out of the path of the articulating panel. However, this solution contradicts the salient aircraft objective of weight minimization. Therefore, it is desirable to provide a latch that reduces the risk of causing damage to the surrounding aircraft structures to which it is attached.

Another limitation of prior art latches is the possible inadvertent opening of the latch by unexpected contact. The above-described latches most often utilize a push-in, trigger-actuated release mechanism for ease of use. Accidental contact with the trigger, such as being hit by an object while in flight, can open the latch. Furthermore, the location of the latch is not easily seen by inspection personnel so that a latch that is not properly closed can go undetected.

Many of the above-described hook latches do not have a safety measure that enables an inspector to visually confirm that the latch is properly closed. Many prior art hook latches also do not have a safety measure that denies access to the trigger release mechanism of the latch to prevent accidental latch release by maintenance personnel or objects that may impact the aircraft during flight. Therefore, it is desirable to provide a latch having the aforementioned safety measures.

Hook latches are used on a wide variety panels having many different distances between the mounting pin and the keeper. To accommodate these many different applications, manufacturers must make and stock a concomitant quantity of latches having the required throw, which greatly increases production cost, inventory and carrying overhead. Therefore, it would be desirable to provide a hook latch having means to adjust the throw to reduce cost, inventory and carrying overhead.

SUMMARY OF THE INVENTION

In one preferred embodiment, the invention comprises a latch mechanism with an arrangement of components that places the center of gravity of the mechanism in front of the mounting pin. Therefore, in applications where the latch swings in the vertical plane, the hook will necessarily hang downward away from the keeper when the latch is opened without the need to add dead weight. This functionality has been achieved in part by locating the mounting pin slot at the very end of the latch arm and arranging the toggle linkage so that the linkage-to-hook pivot joint is on the body of the latch arm in front of the mounting pin.

The latch includes a unique nesting toggle linkage that minimizes overall latch volume. Each link of the linkage has a U-shaped lateral cross section with a central channel that receives the other link when the latch is closed. Furthermore, the links fold toward each other instead of away from each other while closing, which reduces the latch's overall length when fully closed. The latch may include a keeper detector, which prevents the actuation handle from closing if the keeper is not captured by the hook. The keeper detector helps prevent unsuccessful latching and provides a visual indication when a panel is closed but the keeper is not engaged.

In one preferred embodiment, the invention comprises a tension hook latch that applies closing tension between two objects such as a latch mounting pin and a keeper engaged by a hook which extends from one end of the latch. This type of latch is often called a "cinch-up latch" or a "pull-in latch". In one embodiment, the invention comprises a toggle link latch mechanism with an arrangement of components that places the center of gravity of the mechanism in front of the mounting pin. Therefore, in overhead applications where the latch swings in the vertical plane, the hook will necessarily hang downward away from the keeper when the latch is opened without the need to add dead weight. This functionality has been achieved in part by locating the mounting pin slot at the very end of the latch arm and arranging the toggle linkage so that the linkage-to-hook pivot joint is on the body of the latch arm in front of the mounting pin.

The invention also may include a handle safety cover affixed at one end to the front of the handle that extends the length of the handle. The other end of the cover is releasably attached to the toggle linkage. The safety cover prevents access to a trigger mechanism which releases the latch handle from a locked closed position. The invention further may include a sensor, which detects the absence of the keeper in the hook to disable the handle from locking in the closed position when the hook is not occupied by the keeper.

More specifically, the novel tension latch has a latch mechanism for releasably connecting two elements, which is operable between engaged and released positions. The rear end of an elongate handle is pivotably affixed to the latch mechanism about a first axis of rotation and is operative to move said latch mechanism from the engaged position to the released position as the handle is moved from a closed to an open position. The latch handle is lockable in the closed position by a manually operable handle catch. When the latch is mounted overhead and the latch is disengaged with the handle open, the handle extends downwardly away from the latch mechanism by the force of gravity and the cover extends downwardly away from the first end of the handle also by the force of gravity. The handle is spring-biased toward the open position.

The latch mechanism includes a frame member having a hook at one end for engaging an object such as a keeper pin, which occupies a mouth of the hook. The handle catch is spring-biased and is rotatably affixed to a sensor arm which in turn is rotatably affixed to the frame. The sensor arm is moved by objects that are placed into the hook mouth and is spring-biased toward the hook-unoccupied position. A portion of the sensor arm laterally covers the mouth of the hook and disables the operation of the handle catch when the hook is not occupied, thereby preventing the handle from being locked in the closed position unless the hook is occupied.

In one preferred embodiment, a handle cover is hingedly affixed at one end to the front end of the handle and is moveable between open and closed positions. A cover catch on an opposite end of the cover is engageable with the latch mechanism for releasably holding the cover closed. The cover is substantially coextensive with and in close abutment with the handle when the cover is in its closed position. The cover has a spring-biased trigger for releasing the cover from its closed position. The cover is rotatable about a second axis of rotation parallel to the axis of the handle joint and prevents access to the handle catch when the cover is closed. The cover catch is spring-biased and engageable with a toggle link of a toggle linkage of the latch mechanism. The cover catch, the handle and the frame member are constructed and arranged so that the cover cannot be closed when the handle is not first closed and the latch mechanism is fully engaged. The latch is stabilized when fully engaged by an over-center condition of the latch mechanism toggle linkage.

The novel latch provides a high degree of visibility if it is unsecured. One major use of the latch is to fasten aircraft engine cowlings. Modern aircraft engines are very large and have minimal ground clearance. As a result, an unlatched or incompletely-latched condition may not be easily seen during an inspection of the latch mounted on the bottom of the engine. If the novel latch is installed on the bottom of the engine and is not properly closed, the handle hangs down and the handle cover hangs down even farther. This construction makes it much easier to detect if the latch is not properly closed.

In other preferred embodiments, the novel latch is operable between a disengaged position and an engaged position releasably connecting the latch mounting pin on a first static structural element to a keeper on a second, movable structural element. In these embodiments, the latches include means for adjusting the throw of the hook to accommodate different distances between the latch mounting pin and the keeper due to manufacturing tolerances or different applications.

The latches generally comprise a tension mechanism, a hook connected to the tension mechanism, and a handle pivotably connected to the tension mechanism and operable to actuate the tension mechanism between engaged and disengaged positions with the keeper. The latch is operable between the engaged and disengaged positions by rotating the handle between a closed position and an open position. The tension mechanism preferably has a central longitudinal axis, an elongate frame body, and means for pivotally connecting the latch to a mounting pin on the first static structural element. In preferred embodiments, the tension mechanism includes a toggle linkage, wherein the latch is stabilized in the engaged position by an over-center condition of the linkage.

The hook that has a mouth is constructed to grasp the keeper on the second structural element. The hook also has a base connected to and extending axially from a front end of the frame body. Preferably, the hook is connected to the frame body by a connection rod assembly. The throw adjustment means changes the distance between the mouth of the hook and the mounting pin when the tension mechanism is in the engaged position.

In one preferred embodiment, the throw adjustment means comprises means for adjusting the axial length of the connection rod assembly. For example, in one embodiment, the throw adjustment means comprises a turnbuckle having a first threaded rod fixed at one end to and extending axially from the front end of the frame body, a second threaded rod fixed at one end and extending axially from the base of the hook, and a threaded turnbuckle body connecting the free ends of the first and second threaded rods. One of the rods has left-hand threading and the other has right-hand threading. The turnbuckle body has both left-handed and right-handed threading. The turnbuckle body may include means for locking the turnbuckle body at a fixed location on the threaded rods.

In other preferred embodiments, the connection rod assembly includes a first threaded rod fixed to and extending axially from the front end of the frame body, and means for connecting the base of the hook at different locations along the threaded rod. In one preferred embodiment, the means for connecting comprises an adjustment nut threadedly-engaged with the threaded rod and seated in a socket within the base of the hook. The base of the hook includes an unthreaded axial bore extending from the socket toward the mouth of the hook. The free end of the threaded rod extends through the adjustment nut and into the unthreaded axial bore. The free end of the threaded rod has a radially-extending slit which engages an anti-rotation pin fixed in and traversing the unthreaded axial bore to prevent rotational movement of the hook relative to the threaded rod. The depth of the slot and the diameter of the anti-rotation pin are dimensioned to permit axial movement of the threaded rod within the unthreaded bore without the slot disengaging the anti-rotation pin.

Preferably, the adjustment nut includes detent means to resist rotation, i.e., unintended loosening, of the adjustment nut on the threaded rod. The adjustment nut also preferably includes means for engaging a torque-application tool. In one embodiment, the tool engaging means comprises a plurality of equally spaced bores in the periphery of the adjustment nut. In another embodiment, the tool engagement means comprises a plurality of gears arranged on the periphery of the adjustment nut.

BRIEF DESCRIPTION OF THE DRAWINGS

FIG. 1 is a top right front perspective view of one embodiment of the invention;

FIG. 2 is a cross-sectional view of the embodiment shown in FIG. 1;

FIG. 4 is an exploded assembly view of the embodiment show in FIG. 1;

FIGS. 5a through 5e depict a series of paired corresponding perspective and elevational views of another embodiment of the invention in various operational configurations;

DESCRIPTION OF THE PREFERRED EMBODIMENTS

Figure 3:
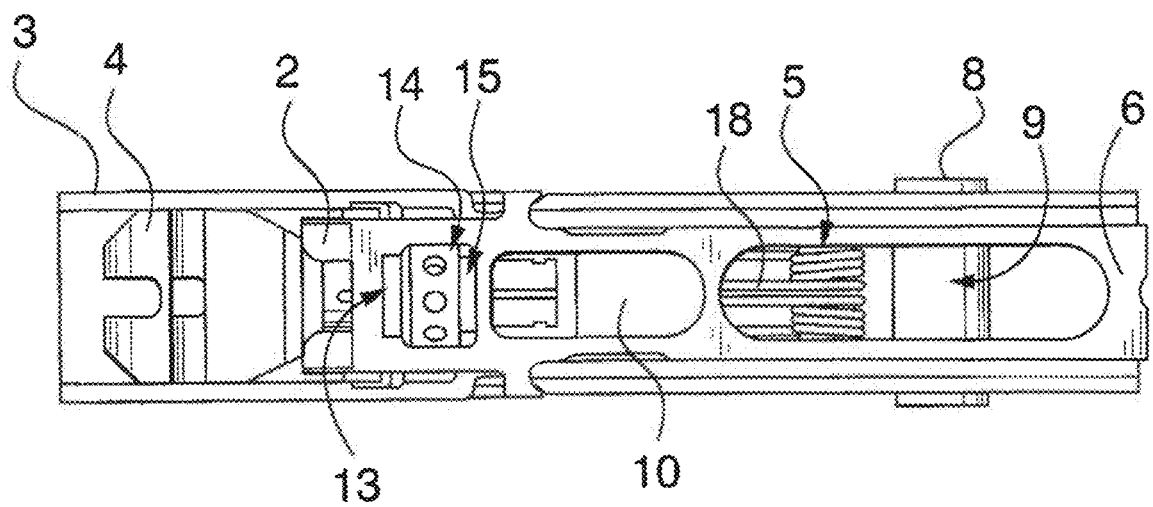
FIG. 3 is a bottom plan view of the embodiment shown in FIG. 1.

For the purpose of illustrating the invention, several embodiments of the invention are described with respect to the accompanying drawings. However, it should be understood by those of ordinary skill in the art that the invention is not limited to the precise arrangements and instrumentalities shown therein and described below. Throughout the specification, like reference numerals are used to designate like elements.

A latch in accordance with one preferred embodiment of the invention is illustrated and described with respect to FIGS. 1-4. Referring first to FIGS. 1 and 2, the latch has a substantially-symmetrical construction about a longitudinal axis so features shown on one side apply equally to the opposite side. The latch generally includes an upper link 1, lower link 10, a handle 3, a hook 4, and additional linkage components that operably connect the handle 3 to the hook 4. As described in detail below, movement of the handle 3 extends and retracts the hook 4 between open and closed positions.

The upper link 1 is constructed of thin sheet metal and has side walls that surround other internal components of the latch to minimize the latch's overall volume and weight. The upper link 1 operably pivots about a mounting pin 8 that connects the latch to an associated fixed structure such as a portion of an aircraft (not shown). Rivets 7 straddle the front walls of the upper link and hingedly connects it to the front of a lower link 10, which nests inside a central channel of the upper link 1. The lower link 10 is also pivotally connected to an elongate latch arm 6 by a pin 5. The rear walls of the latch arm 6 include a pair of slots 6b in which the mounting pin 8 can translate. Each link includes a center channel between opposing thin sidewalls forming a U-shaped lateral cross section. When assembled, the body of the latch arm 6 nests within the lower link 10, which in turn nests within the upper link 1. This nested configuration provides a very compact device as better appreciated when viewing FIG. 3. This combination of elements forms the latch toggle linkage.

A handle 3 is rotatably connected to the lower link 10 and the upper link 1 by a pin 17, which carries a spring 22 that biases the handle upward away from the lower link 10 toward the open position of the latch. The location of the pin 17 permits a small amount of free travel of the handle. Likewise, another spring 18 biases the lower link upward away from the latch arm 6 to hold the latch open. The handle 3 actuates the latch between open and closed positions. After a limited amount of free movement restricted by the back end of the handle abutting the lower link 10, continued lifting of the handle 3 will lift the lower link upward, extending the hook and releasing the latch as best seen in FIGS. 5d and 5e.

As described above, the handle extends and retracts a latch arm 6 having hook 4 at the front end. The hook 4 engages and grabs a keeper (not shown) in the closed position and applies a tensile clinch load between the keeper and the latch mounting pin 8.

The handle 3 includes a trigger 2 that releasably locks the handle 3 in a closed position. The trigger 2 is pivotally attached to the handle 3 by a pin 20, which includes a concentric sleeve 21 about which the handle can pivot to a limited extent. The trigger 2 releasably holds the handle 3 down in the configuration shown in FIGS. 1 and 5a when the latch is locked. As best seen in FIG. 4, the trigger 2 has a generally-planar base 2b and two side arms 2a fixed at their proximal ends to and extending transversely from opposed sides of the base 2b. The distal end of each arm 2a includes a transverse slot 2c, which creases a barbed end. The slots 2c are shaped and located to engage a catch 6a on opposed sides of the latch arm 6. In this embodiment, the catches 6a comprise a small protuberance that extends from the side walls of the latch arm 6. The trigger 2 is spring loaded and the side arms 2a include barbed ends, which bear against the catches 6a as the handle 3 is closed. This action ensures that the slots 2c capture the catches 6a to provide a self-actuating effect when the handle 3 is pushed fully closed.

An exploded view of the latch arm 6, and the other latch components, is shown in FIG. 4 from a bottom perspective. The latch arm 6 is arranged in fixed connection to a hook 4 at the front end and in translating connection to the mounting pin at the rear end. The mounting pin 8 is surrounded by a bushing 9 received through a pair of longitudinally-extending slots 6b in the side walls of the latch arm 6. The hook assembly 4 consists of hook-shaped head 4a and a cylindrical mount 4b, which is constructed to cooperatively engage and connect to a yoke in the front of the latch arm 6. A nut 14, nut plate 13, spring 15 and stop pin 16 connect the hook 4 to the yoke.

The trigger 2 is connected to the handle 3 by a pin 20. Another spring 12 biases the trigger 2 upwardly so that its top surface is flush with the top of the handle 3 when the latch is closed and locked as shown in FIG. 1. Each side arm 2a of the trigger 2 has a slot which engages the locking catch 6a protruding from the sides of the latch arm 6 as seen in FIG. 1 and as described above.

The various components discussed above are shown assembled and in the locked position viewed from the side and the top in FIG. 2. In a preferred embodiment, the hook 4 includes means for detecting whether or not the hook is engaged with the keeper. In one embodiment, the detecting means 11 is fixed to the head 4a as best seen in FIG. 4. The detecting means includes a sensor lever 11c having one arm that is biased downward into the mouth of the hook 4. When the keeper (not shown) properly occupies the hook 4, a first lever arm is pushed upwardly against the bias of a spring 11b into the position shown in this FIG. 2. Otherwise, when the mouth of the hook 4 is unoccupied, the first lever arm will point downwardly and a second lever arm will then point upwardly and make contact with the handle 3 to stop the handle 3 from fully closing. Thus, the detecting means prevents the latch 3 from closing if the hook is not properly engaged with the keeper.

The compact design of the latch is best illustrated in FIG. 3. The major components, including the upper link 1, the lower link 10, the latch arm 6, and the handle 3 all nest with one another more or less when the latch is closed. As shown in FIG. 4, the upper link 1 has U-shaped central channel with sidewalls that surrounds the lower link 10 and part of the handle 3. The lower link 10 likewise has a channel that surrounds a portion of the latch arm 6. In addition, the upper link 1 surrounds a portion of the handle 3. As depicted in FIG. 3, the relatively thin sidewalls of the links provide a minimal lateral dimension of the latch. The length of the latch is also minimized by the toggle linkage because the toggle links fold together rather than spread apart as leverage is applied to the hook when it is being closed. This feature is illustrated in reverse order in the opening sequence of FIGS. 5a through 5e. The construction of the toggle linkage provides an over-center alignment of the link joints so that a portion of the applied load is transmitted through the linkage to forcibly hold the latch in a stable closed condition.

FIGS. 5a through 5e depict a sequence of configurations of the latch as it transitions from fully closed to fully open. A top perspective view of the latch is shown on the left of each Figure. On the right of each Figure, the latch is shown in the same configuration as on the left but in an upside-down, side-elevational view, which is a typical in an aircraft application where the latch swings in the vertical plane. Operation of the keeper detecting means 11 is not shown since the associated mating keeper is not depicted here.

In FIG. 5a, the latch is shown properly closed and secured. A portion of the load applied between the hook and the mounting pin 8 holds the latch closed by virtue of an over-center alignment of the linkage joints. In FIG. 5b, the latch is shown immediately after the trigger 2 has been depressed to release the handle from the locked position. Initial depression of the trigger rotates the side arms 2a out of engagement with the catches 6a on latch arm 6.

In FIG. 5c, the latch is shown after gravity and the spring has urged the handle 3 outward to the extent of its free travel on the lower link. At this location, a back end of the handle contacts the top of the lower link. In this configuration with the handle popped outward, the handle can be easily grasped to open the latch.

In FIG. 5d, the latch is shown after the handle has been pulled open, which extends the hook to its maximum reach or take-up position. FIG. 5d illustrates the nesting of the links 1 and 10 together with the handle 3 as well as disengagement of the side arm 2a from the catches 6a.

FIG. 5e depicts the maximum reach position of the hook 4, which corresponds to a release position of the hook 4 from a keeper. A spring biases the lower link away from the hook 4 to hold the latch fully opened. With the keeper released, the latch arm rotates about the mounting pin 8, which allows the hook 4 to hang down away from the keeper (to the extent allowed by surrounding structures) because the center of gravity of the latch is in front of the mounting pin 8.

With the operational explanation of FIGS. 5a through 5e taken together with the explanation of FIGS. 1 through 4, a full understanding of the invention will have been appreciated by one of skill in the mechanical arts. It will be readily apparent that the objects of the invention have been achieved by providing a light-weight latch with an extremely small kinematic envelope while allowing adequate reach and closing leverage. Furthermore, the objective of providing a lever latch that is protective of surrounding structures has also been achieved.

A latch 111 in accordance with another preferred embodiment of the invention is illustrated and described in FIGS. 6-11. The latch 111 has a substantially-symmetrical construction about a longitudinal axis so features shown on one side apply equally to the opposite side.

Figure 6:
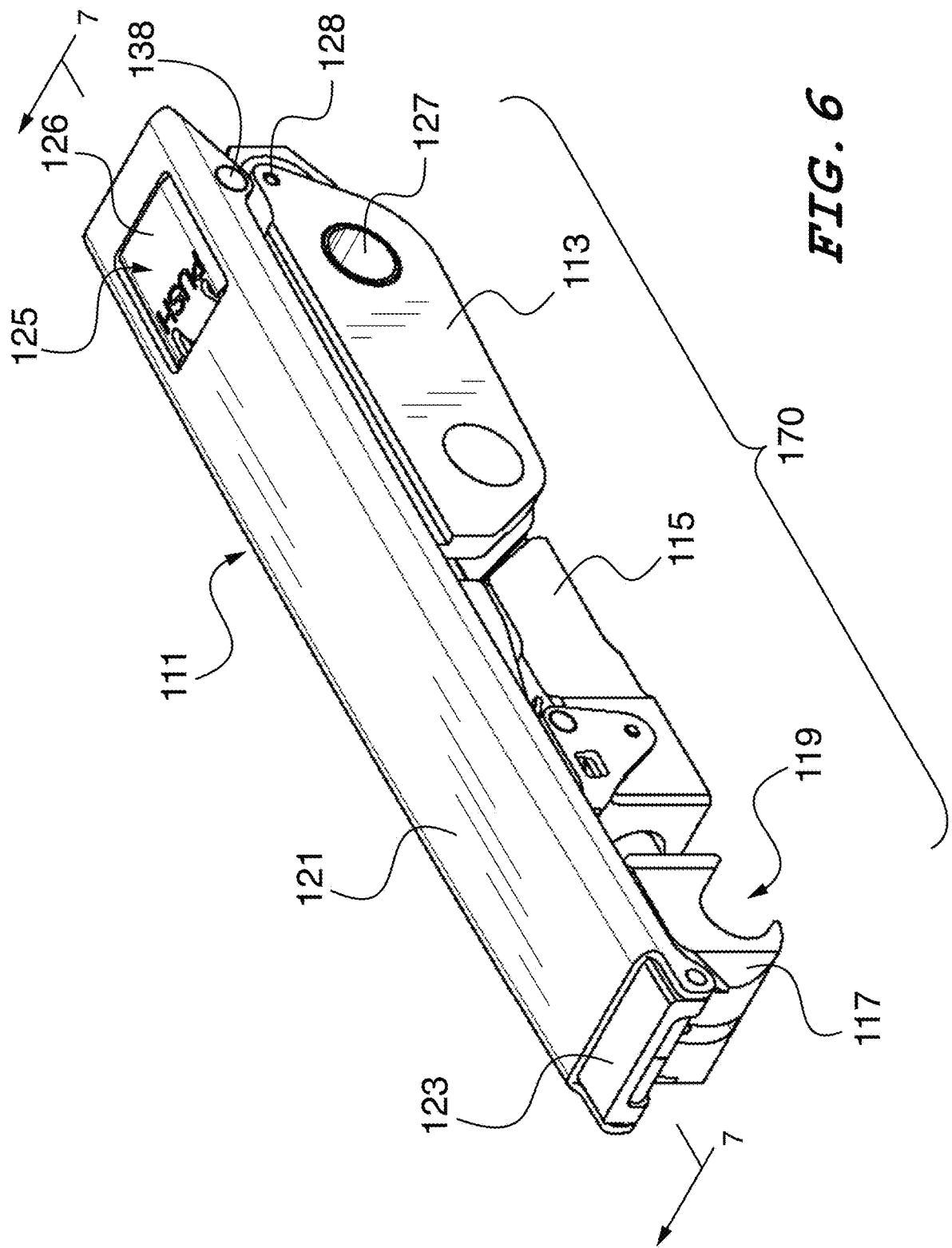
FIG. 6 is a top front perspective view of a latch in accordance with a preferred embodiment of the invention.

Referring to FIG. 6, the latch 111 is shown in the closed position. The latch 111 generally comprises a tension latch mechanism, designated generally by reference numeral 170, a handle 123 connected the latch mechanism 170, and a cover 121 connected to the handle 123. In a preferred embodiment the latch mechanism 170 includes a frame member 115, a toggle linkage 113 connected to a first (rear) end of the frame, and a hook 117 connected to a second (front) end of the frame. A first (rear) end of the handle 123 is pivotally connected to the linkage 113. A second (front) end of the handle 123 is pivotally connected to the cover 121. As described in detail below, movement of the handle 123 extends and retracts the hook 117 between open and closed positions. The linkage 113 is structurally and functionally similar to the linkage of the latch described above with respect to FIGS. 1-6.

Figure 11:
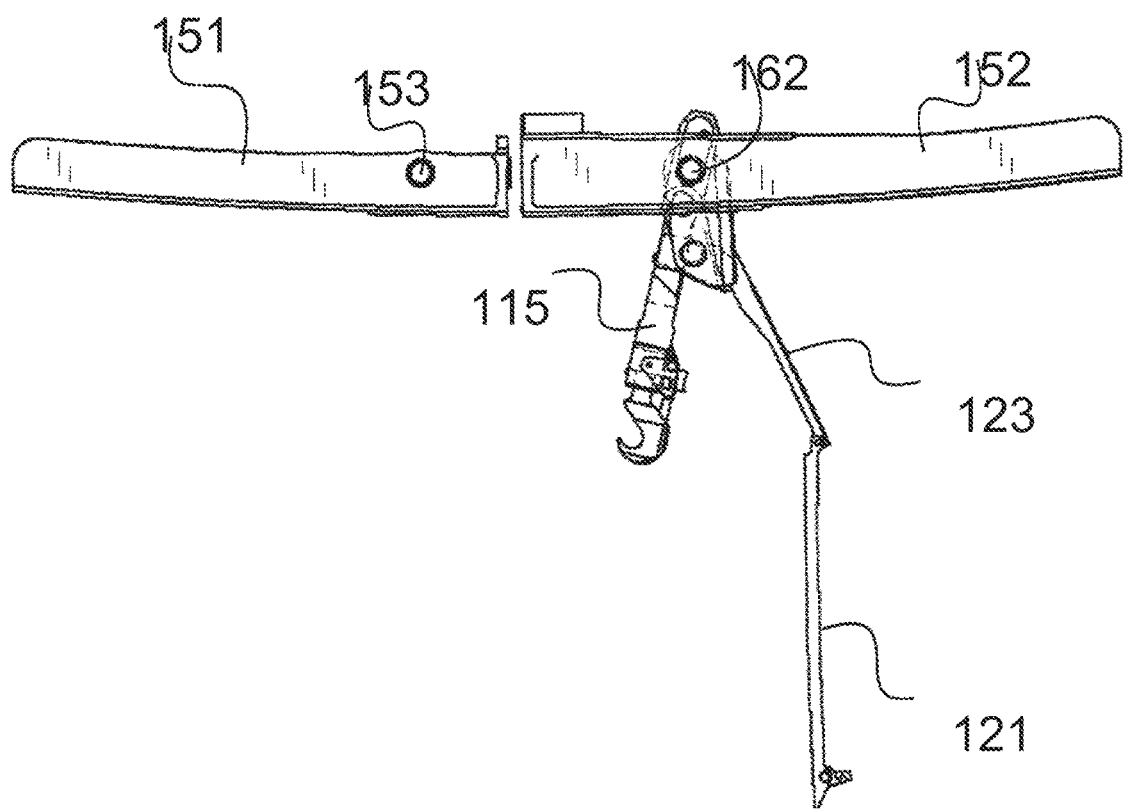
FIG. 11 is a left side elevation showing the latch of FIG. 6 in the open position and affixed to a portion of an aircraft adjacent to a fan cowl housing.

As best seen in FIG. 11, the latch 111 connects to a fixed portion of the aircraft 52 by a mounting pin 162, which extends through a mounting pin bushing 127. The latch 111 provides tension engagement between the mounting pin 162 and a second element such as a keeper 153, which is fixed to a movable portion 151 of the aircraft. In a preferred embodiment, the keeper 153 engages and sits in the mouth 119 of the hook 117.

Figure 8:
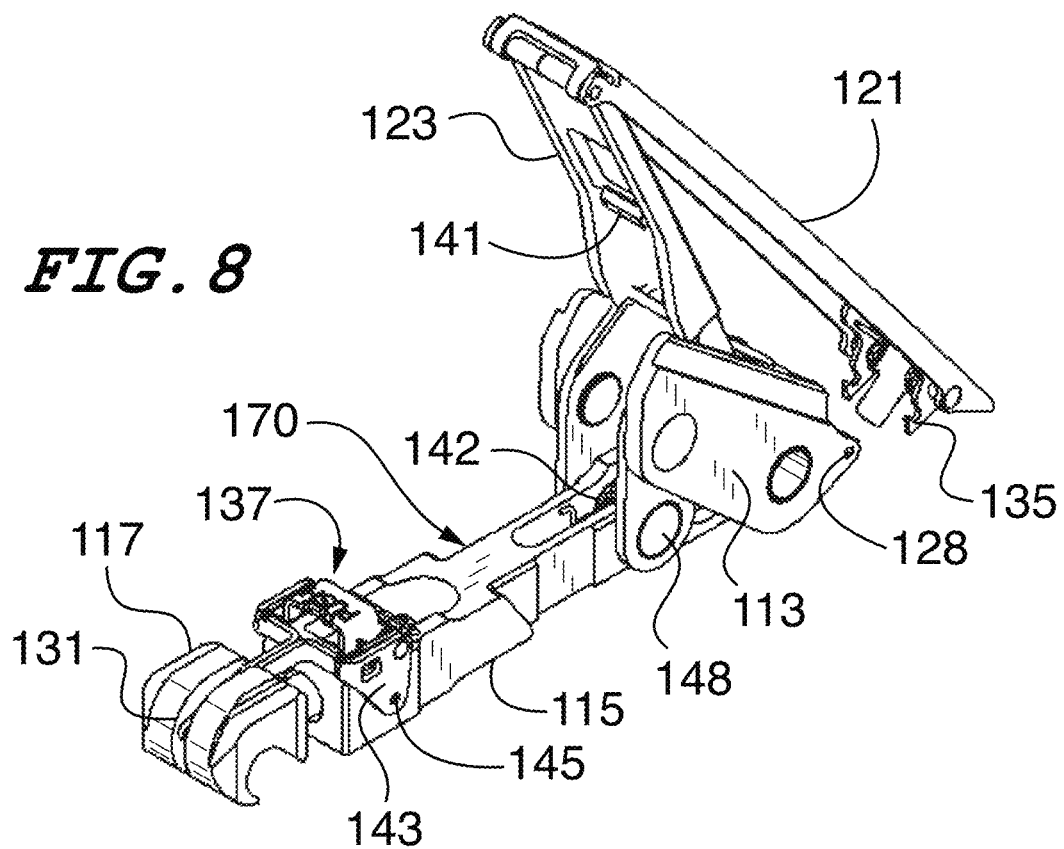
FIG. 8 is a top right perspective view of the latch of FIG. 6 shown in the open position.
Figure 9:
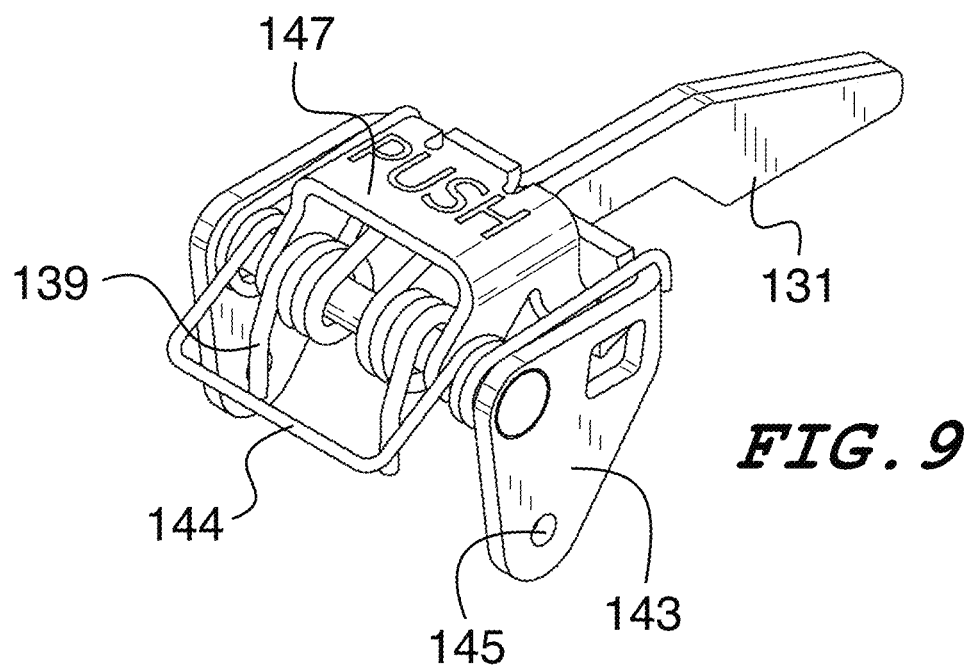
FIG. 9 is a top rear perspective view of the handle latch and hook sensor assembly of the latch of FIG. 6.

A handle cover 121 is pivotally connected to the front end of the handle 123 as best seen in FIG. 8. The cover 121 nests in close abutment with the handle 123 when the latch 111 is closed as seen in FIG. 6. In one preferred embodiment, the cover 121 is held closed by a cover catch 125 located proximate the back end of the handle 123. The cover catch 125 is pivotally connected to the cover 121 by a pivot pin 138. The catch 125 includes barbed hooks 135 that releasably engage catch pins 128 on the inside of the toggle linkage 113 as best seen in FIG. 8. The top of the catch 125 includes a trigger portion 126 that lies substantially flush with the top of the cover 121 when the latch 111 is closed as shown in FIG. 6.

Figure 7:
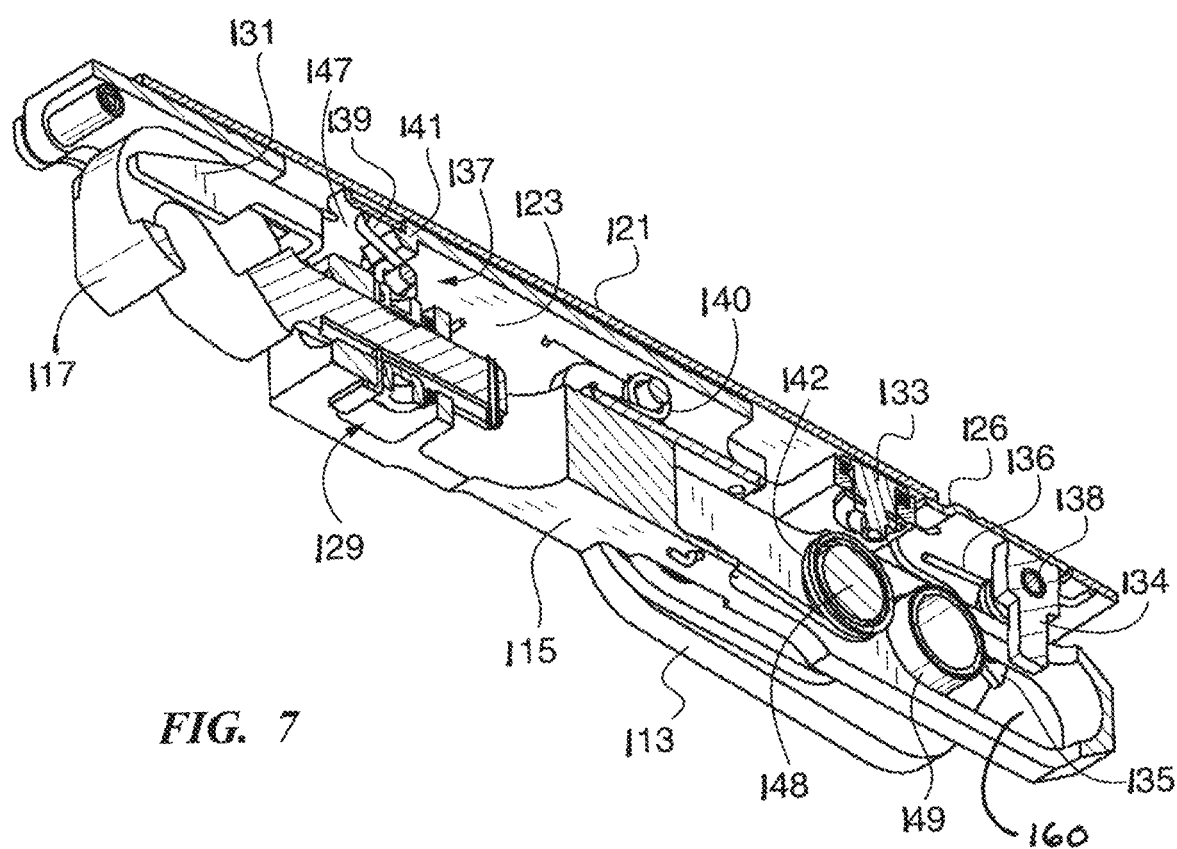
FIG. 7 is a bottom right cross-sectional, perspective view of the latch of FIG. 6.

FIG. 7 shows the underside of the cover catch 125 at the rear of the latch 111. The catch trigger 126 is biased toward its home position by a spring 136. A plunger spring assembly 133 biases the cover away from the toggle linkage 113. A rubber bumper 134 is attached to the pivot pin 138. The bumper 134 protects surrounding objects and the catch 125 from impact when the latch 111 swings open.

Referring to FIG. 7, the latch 111 is connected to a static structure by a mounting pin 162 (shown in FIG. 12) that extends through the mounting bushing 149. Linear, axial movement of the frame 115 and hence hook 117 relative to the mounting pin 162 is enabled by a slot 160 at the rear of the frame 115. One end of a handle 123 is affixed to the linkage 113, which is affixed to the frame at joint 148. The other end of the handle 123 is fixed to the cover 121. The linkage 113 includes a main spring 142 that biases the linkage 113 toward the released position. The handle 123 is biased toward the open position by a spring 40. The latch 111 is stabilized in the closed and engaged position by an over-center condition of the toggle linkage 113.

Referring to FIG. 7, the frame 115 includes a hook-length adjustment mechanism 129, which adjusts the "throw" of the hook, i.e., the length of the projection of the hook 117 from the frame 115 in the extended position. The adjustment mechanism 129 also adjusts the length of the projection of the hook 117 from the frame 115 in the retracted position. Thus, the adjustment mechanism 129 enables the latch to be used in a variety of applications where the distance between the mounting pin 151 and the keeper 153 is different. Furthermore, by adjusting the throw of the latch for a given distance between the mounting pin 151 and the keeper 153, the tensile load applied by the latch can also be increased or decreased depending on the application.

In a preferred embodiment, the latch 111 includes means for detecting whether or not the hook 117 is engaged with the keeper 153. The frame 115 has a hook sensing means that detects whether the keeper 153 occupies the mouth 119 of the hook 117. In one preferred embodiment, the detecting means includes a sensor arm 131 that is normally biased downwardly by a hairspring 144 into the mouth 119 of the hook 131. The hairspring 144 acts against the frame 115. The sensor arm 131 is rotatably mounted to the fame 115 by a bracket 43 best seen in FIGS. 9 and 10. The bracket 143 is rotatably mounted on the frame 115 at a joint 145. When the keeper (not shown) properly occupies the mouth 119 of the hook 117, the sensor arm 131 is pushed upwardly against the bias of a spring 144 to the position shown in FIG. 7. In FIG. 7, the sensor arm 131 is shown in a retracted position as if the keeper 153 occupied the mouth 119; however, the keeper 153 is not shown. Normally, the keeper 153 contacts and urges the arm 131 into the position shown in FIG. 7.

Otherwise, when the hook 117 is unoccupied, the sensor arm is biased into the mouth 119 of the hook 117.

FIGS. 7 and 8 show the cover 121 closely abutting and covering the handle 123. A handle trigger assembly 137 releasably holds the handle 121 in this orientation. The handle trigger assembly 137 is shown in more detail in FIGS. 9 and 10. The trigger assembly 137 generally comprises a trigger 147, which is rotatably mounted on the bracket 143. The trigger 147 is visible and accessible through a window in handle 123. A hairspring 139 biases the trigger upward to a home position. The trigger 147 is constructed and arranged to releasably engage (at the back edge) a lip 141 on the underside of the handle 123. When engaged with the lip 141, the trigger assembly holds the handle 123 closed. When the trigger 147 is depressed, it disengages with the lip 141 and releases the cover 121.

Referring to FIG. 8, the latch 111 is shown in the open position when not mounted overhead. The latch 111 is biased to this position by a main spring 142, which acts between the frame 115 and the toggle linkage 113. The free end of the cover releasably connects to the linkage 113 by way of the catch 125. Since the cover 121 moves with the handle 123, when the handle is open, the cover 121 cannot be closed against the handle because the catch hooks 135 are moved rearward and cannot engage the catch pins 128. As a result, when the handle 123 is open, the cover 121 must also be open. This feature facilitates the high visibility function of the latch, especially when the latch is mounted overhead as shown in FIG. 6.

In one embodiment, the detecting means 11 is fixed to the head 4a as best seen in FIG. 4. Otherwise, when the mouth of the hook 4 is unoccupied, the first lever arm will point downwardly and a second lever arm will then point upwardly and make contact with the handle 3 to stop the handle 3 from fully closing. Thus, the detecting means prevents the latch 3 from closing if the hook is not properly engaged with the keeper.

The elements of the latch are constructed and arranged so that the handle 121 cannot close when the hook 117 is unoccupied because the handle trigger moves with the sensor since it is mounted on the sensor bracket 143. When the sensor arm 131 is rotated into the hook mouth by the spring 144, the engagement edge of the trigger 147 moves forward with it away from its engagement position with the handle catch lip 141. This movement disables the handle catch and the handle then freely moves away from the latch mechanism by action of the handle spring 140. When mounted overhead, the latch has the orientation shown in FIG. 6, which very visibly alerts inspectors that the keeper has not been engaged and that an unsafe condition exists.

Figure 10:
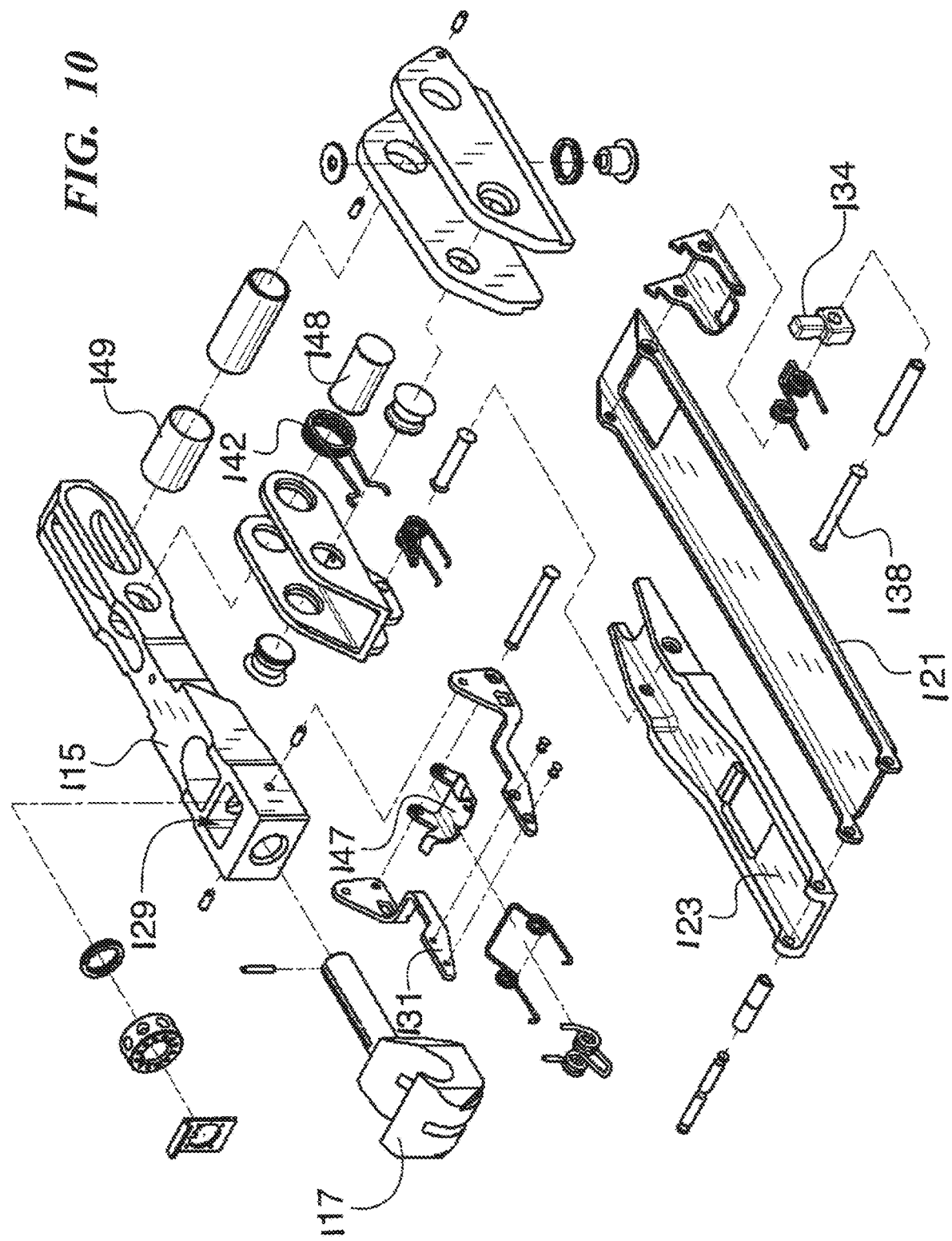
FIG. 10 is an exploded assembly view of the latch of FIG. 6.

Referring now to FIG. 10, an exploded assembly view shows all of the individual parts of one preferred embodiment for a complete explanation of how this embodiment of the invention is constructed. The correspondence between the parts in this Figure and the parts shown in FIGS. 7-10 will be readily apparent to those of skill in the art without the need for repetitive numbering.

Referring now to FIG. 11, a preferred embodiment is depicted installed overhead on an aircraft for joining panels 151 and 152 with the latch released. The movable panel 51 may be, for example, a moveable engine fan cowl housing which includes a keeper 53 while the stationary panel 152 may be a fixed part of the engine. The latch is affixed to the stationary panel 152 by a mounting pin 162 that extends through bushing 127. Because the mounting pin 162 is located at the back end of the latch, the frame 115 and hook 117 hang downwardly by the force of gravity safely away from the engine components. In this orientation, the handle 123 and cover 121 together hang down even farther than the hook 117 at the end of the latch. This construction makes the open latch more visible to maintenance personnel when the bottom of the engine is close to the ground.

Latches in accordance with further embodiments of the invention are shown in FIGS. 12-22 and are designated generally be reference numerals 211, 311, and 411. In each of these embodiments, the latch has a substantially-symmetrical construction about a central, longitudinal axis so features shown on one side apply equally to the opposite side. Moreover, each latch 211, 311, 411 has the same construction except for its hook throw adjustment mechanism, each of which is separately described. Therefore, the common structural elements of each embodiment are described with reference to the embodiment of FIGS. 12-17, and the same structural elements on the embodiments shown in FIGS. 18-22 are identified using the same reference numerals.

Figure 12:
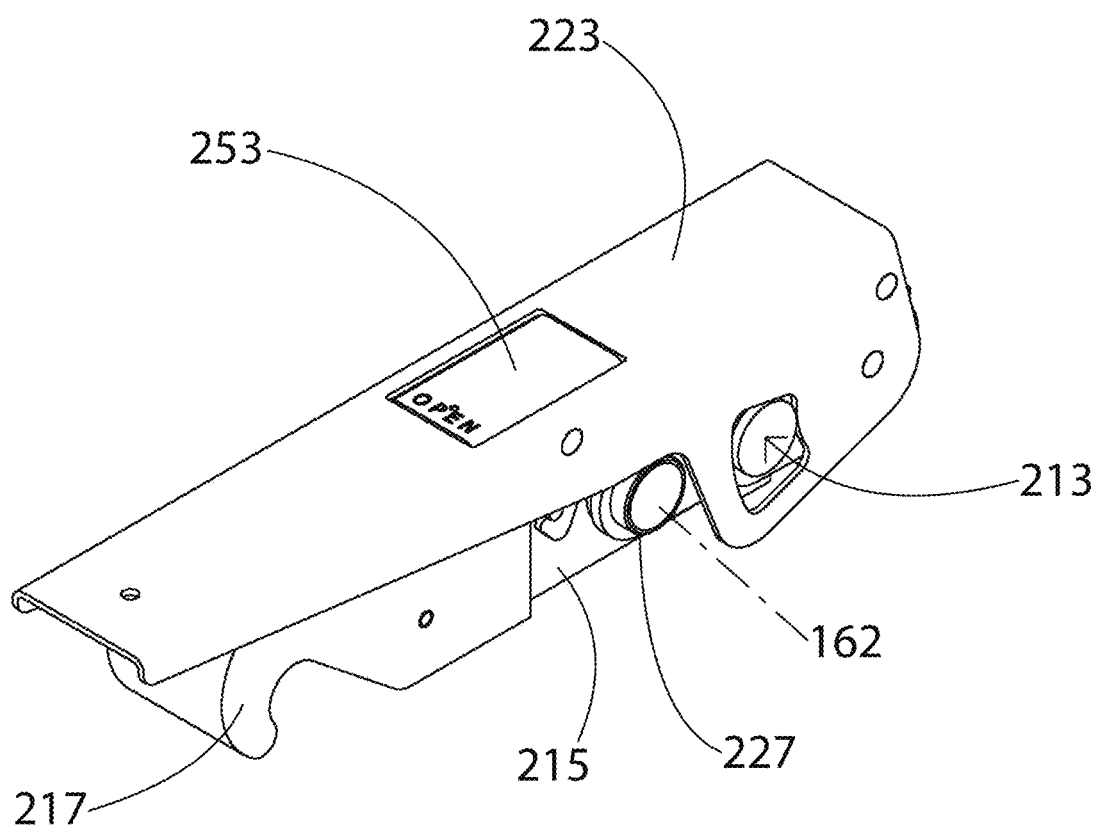
FIG. 12 is a perspective view of top front perspective view of a latch in the closed position in accordance with another preferred embodiment of the invention.
Figure 13:
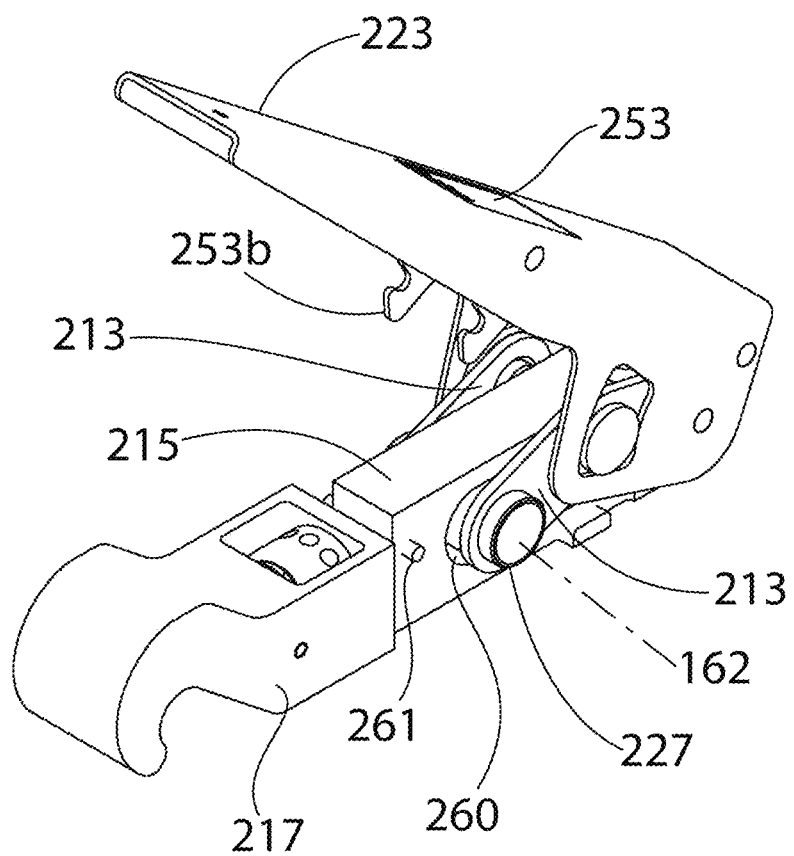
FIG. 13 is a top front perspective view of the latch of FIG. 12 in a partially open position.

Referring to FIGS. 12-17, the latch 211 is shown in the closed position in FIG. 12 and in a partially-open position in FIG. 13. The latch 211 generally comprises a tension mechanism, a handle 223 connected to one end of the tension mechanism, a hook 217 connected to the other end of the tension mechanism, and means to adjust the throw of the hook 217 on the tension mechanism. In a preferred embodiment the tension mechanism 170 includes a frame body 215 and a toggle linkage 213 connected to a first (rear) end of the frame body 215. In preferred embodiments, the hook 217 is connected to a second (front) end of the frame body 215 by the hook throw adjustment means, and the handle 223 pivotally connected to the first (rear) end of the frame body 215. As described in detail below, movement of the handle 223 toggles the linkage 213 between extended and retracted positions, which in turn, extends and retracts the hook 217 between open and closed positions.

Figure 14:
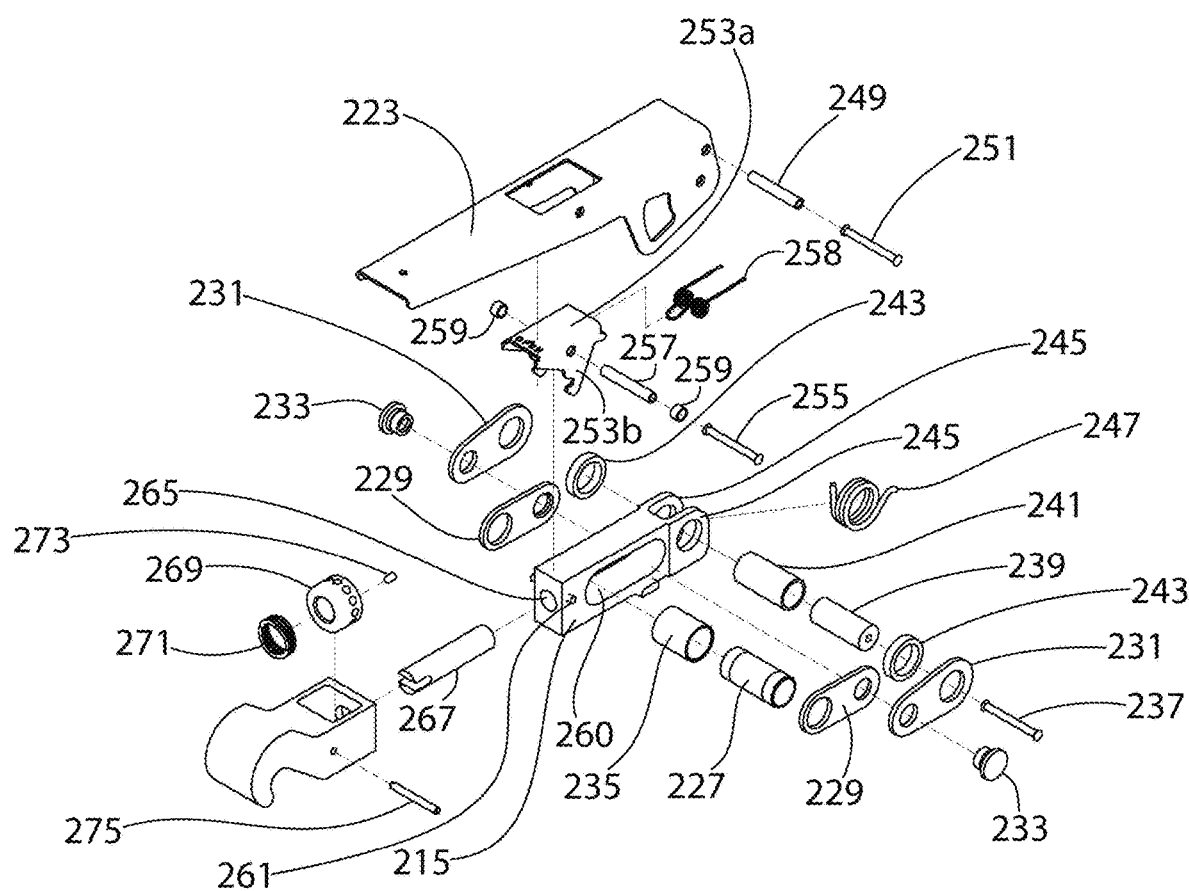
FIG. 14 is an exploded assembly view of the latch of FIG. 12.

The toggle linkage 213 is functionally similar to the linkage of the latches described above. Referring to FIG. 14, the toggle linkage 213 comprises opposed pairs of first links 229 and second links 231. The back end of each first link 229 is pivotally connected to the front end of a second link 231 by a hinge pin 233, which in a preferred embodiment comprises a short link rivet. The front end of each first link 229 is connected to a mounting sleeve 227, which traverses the slot 260 in the frame body 215. In one preferred embodiment, the mounting sleeve 227 is surrounded by a bushing 235 to reduce friction when the mounting sleeve 227 translates and rotates within the slot 260.

The back end of each second link 231 is pivotally connected to a rear hinge pin assembly, which is seated in opposed hinge brackets 245 fixed to and extending from the back of the frame body 215. In a preferred embodiment, the hinge pin assembly comprises an inner bushing 239 and outer bushing 241 concentrically and rotatably mounted on a first rivet 237. The heads of the rivet 237 abut the outer surface of the handle 223. Opposed link spacers 243 are seated on the outer bushing 241 intermediate the outer surface of the hinge brackets 245 and the inner surfaces of the second links 231.

A torsion spring 247 is seated on the outer bushing 241 intermediate the hinge brackets 245. One leg of the spring 247 abuts frame body while the other leg abuts a rear bushing 249, which is mounted on a second rear rivet 251 at the rear of the handle 223 above the first rivet 237. The heads of the second rear rivet 251 also abut the outer surface of the handle 223. The torsion spring 247 is wound in a direction that normally biases the handle 223 into the open position.

The handle 223 includes a trigger 253 that releasably locks the handle 223 in a closed position. The trigger 253 is pivotally attached to the handle 223 by a third rivet 255, which is surrounded by a concentric bushing 257 inside the handle 223 about which the handle 223 can pivot to a limited extent. The trigger 253 releasably holds the handle 3 down in the configuration shown in FIG. 12 when the latch 211 is locked. As best seen in FIG. 14, the trigger 253 has a generally-planar base 253*a* and two side arms 253*b* fixed at their proximal ends to and extending transversely from opposed sides of the base 253*a*. The distal end of each arm 253*b* includes a transverse slot 253*c*, which creases a barbed end. The slots 253*c* are shaped and located to engage a catch 261 on opposed sides of the base frame body 215. In this embodiment, the catches 261 comprise a small protuberance that extends laterally from the side walls of the frame body 215. Opposed spacers 259 are also concentrically mounted on the third rivet 255 in between the outer surface of the side arms 253*b* and the inner sidewall of the handle 223. A second torsion spring 258 is seated on the bushing 257 intermediate the arms 253*b* of the trigger 253. The second torsion spring 257 normally biases the trigger in the closed position, which ensures that the slots 253*c* capture the catches 261 to provide a self-actuating effect when the handle 223 is pushed fully closed.

Similar to the latches shown above, the latch 211 connects to a fixed portion of the aircraft 152 by a mounting pin 162, shown in FIG. 11, which extends through the mounting sleeve 227 in the toggle linkage 213. The latch 211 provides tension engagement between the mounting pin 162 and a second element such as the keeper 153 shown in FIG. 11, which is fixed to a movable portion 151 of the aircraft. In a preferred embodiment, the keeper 153 engages and sits in the mouth of the hook 217.

Referring to FIG. 13, linear, axial movement of the frame body 215 and hence the linear, axial movement of the hook 217 relative to the mounting pin is enabled by the slot 260 in the frame body 215. One end of a handle 223 is affixed to the linkage 113, which is affixed to the frame at joint 148, shown in FIG. 8. The other end of the handle 123 is fixed to the cover 121. The linkage 113 includes a main spring 142 that biases the linkage 113 toward the released position. The handle 123 is biased toward the open position by a spring 140. The latch 111 is stabilized in the closed and engaged position by an over-center condition of the toggle linkage 113.

Figure 15:
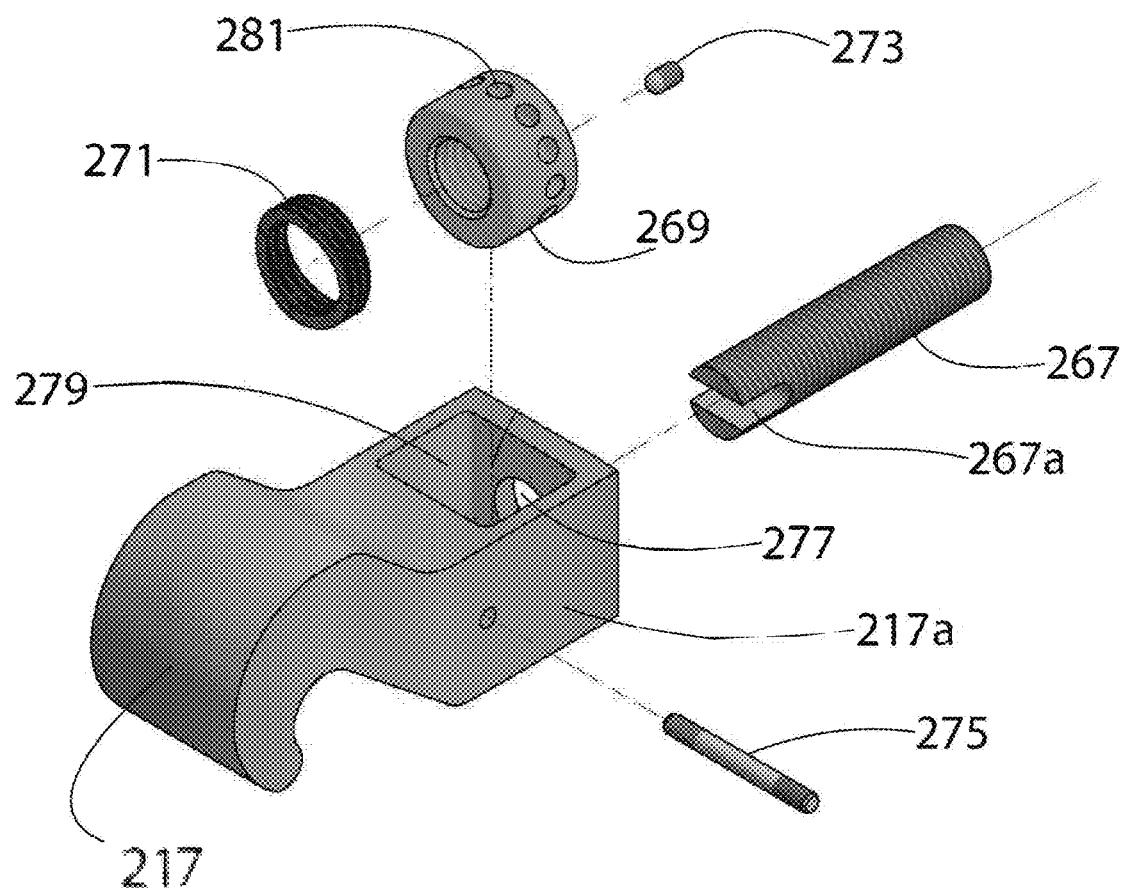
FIG. 15 is an enlarged exploded assembly view of the hook and throw adjustment mechanism of the latch of FIG. 12.
Figure 16:
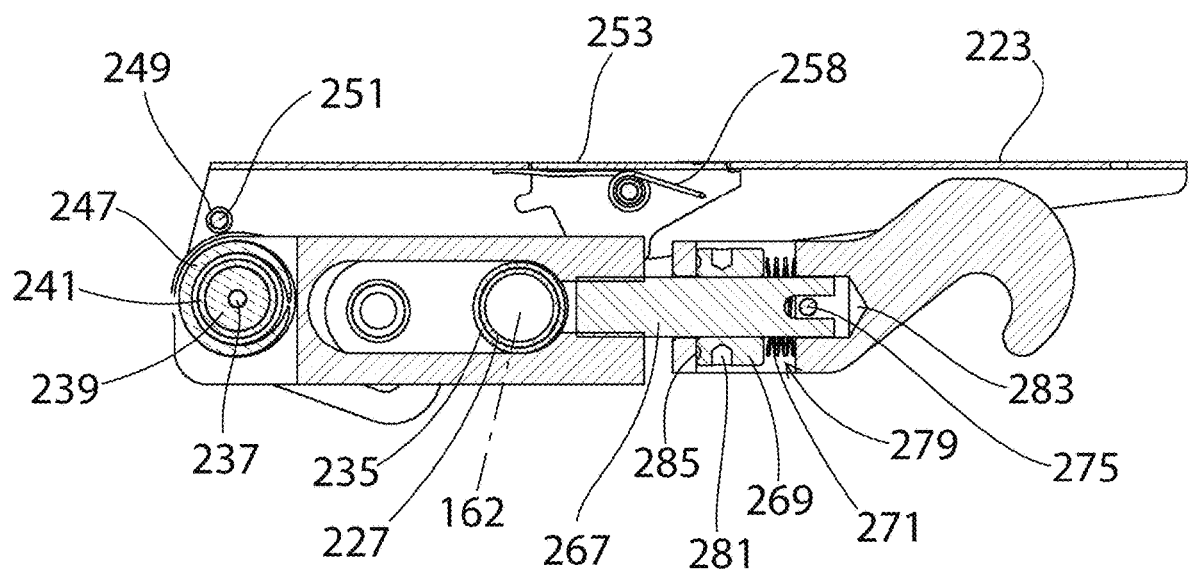
FIG. 16 is a cross-sectional view of the latch of FIG. 12.
Figure 17:
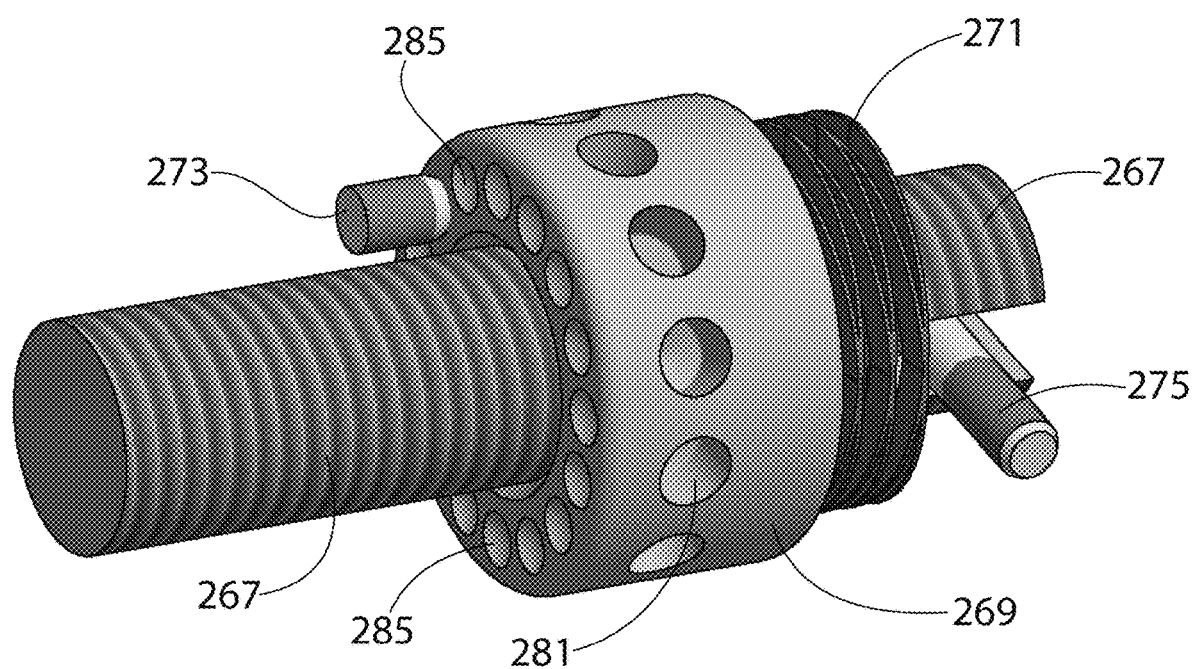
FIG. 17 is an enlarged perspective view of the throw adjustment mechanism of the latch of FIG. 12.

As best seen in FIGS. 15 and 16, the latch 211 includes an adjustment mechanism, which adjusts the "throw" of the hook, i.e., the length of the projection of the hook 217 from the frame body 215 in the extended or retracted position. Thus, the throw adjustment mechanism enables the latch to be used in a variety of applications where the distance between the mounting pin 151 and the keeper 153 is different, shown in FIG. 11. Furthermore, by adjusting the throw of the latch 211 for a given distance between the mounting pin 162 and the keeper 153, the tensile load applied by the latch can also be increased or decreased depending on the application.

In the embodiment shown in FIGS. 12-17, the throw adjustment mechanism is constructed and arranged primarily outside of the frame body 215, which allows it to be made thinner and lighter. In the embodiment shown in FIGS. 12-16, the throw adjustment mechanism comprises a threaded rod 267 that engages a threaded nut 269, which sits in a socket 279 in the base of the hook 217. The back end of the threaded rod 267 is threaded into and fixed in a threaded bore 265 in the front end of the frame body 215 and extends generally coaxially therewith. The front end of the threaded rod 267 has a radial slit 267a and extends through an aperture 277 in the base 217a of the hook 217 and sits in a bore 283 in the end of the base 217a that has shape that compliments the shape of the rod 267. The cavity also has a pin 275 that traverses the cavity. The pin 275 is slightly smaller than the slit 267a so that the rod 267 can translate axially within the socket 279 even when the slitted end of the rod is installed over the pin 275; however, in this configuration, the pin prevents the threaded rod 267 from rotating within the socket. The nut 269 is threaded onto the rod 267 and is seated in the socket 279 in the base 217a of the hook 217.

In this preferred embodiment, the adjustment nut 269 has a round shape and includes a plurality of radially-extending bores 281 in the outer annular surface. A compression spring 271 surrounds the rod 267 and is also seated in the socket 279. The adjustment nut 269 can be rotated by inserting a pin or other pointed tool into one of the bores 281 and applying torque to the nut 269. As the adjustment nut 279 rotates, the throw of the hook 217 either increases of decreases depending on the direction of rotation of the adjustment nut 269.

The latch 211 includes means for releasably locking the adjustment nut 269 in a desired angular location after the throw of the hook 217 has been adjusted to a desired length. Referring to FIGS. 15 and 16, a detent pin 273 extends through the wall of the base of the hook 217 and protrudes into engagement with the back face of the adjustment nut 269, which includes a plurality of engagement features machined into the back face nut. Referring to FIG. 16, in a preferred embodiment, the engagement features comprise equally-spaced, semi-circular concavities 285 having a size and shape that complement the size and shape of the head of the detent pin 273. As the adjustment nut 269 is rotated, the detent pin 273 sequentially engages and disengages the concavities 285 until the adjustment nut 269 is positioned in the desired angular location. The detent pin 273 and mating concavity 285 prevent the nut from inadvertently loosening from that desired angular location.

Figure 18:
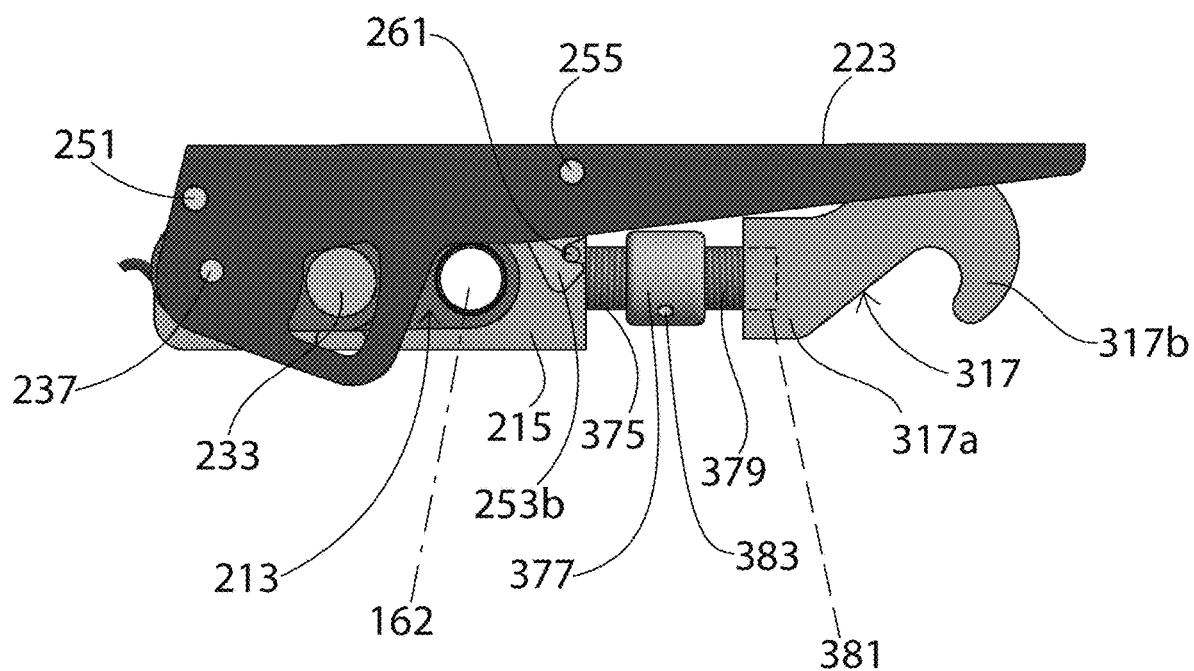
FIG. 18 is a side elevation of a latch in accordance with an additional preferred embodiment of the invention.
Figure 19:
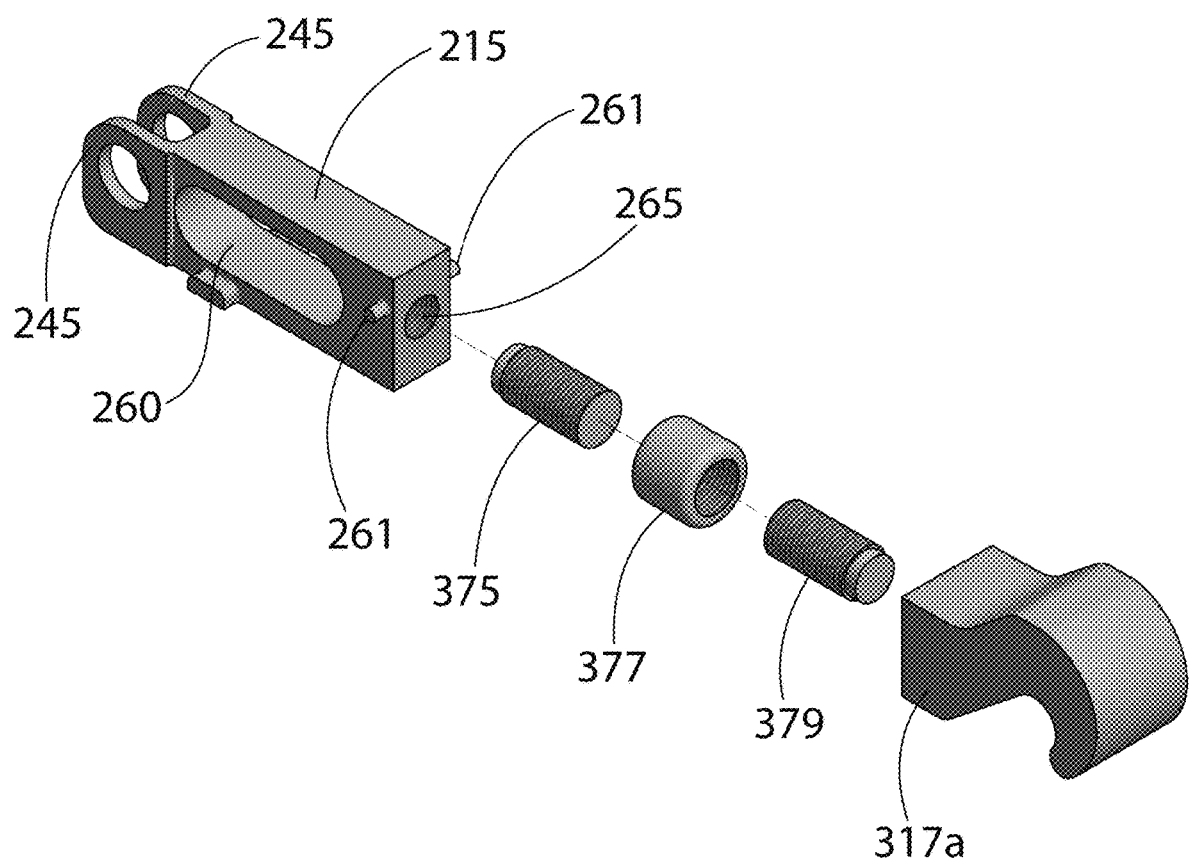
FIG. 19 is an exploded assembly view of the hook and throw adjustment mechanism of the latch of FIG. 19.

An additional embodiment of the invention having a turnbuckle throw-adjustment mechanism is shown in FIGS. 18-19. In this embodiment, the handle, toggle linkage 213 and frame body 215 have the same construction as the latch 211 shown in FIGS. 12-17.

In the embodiment shown in FIGS. 18-19, the throw-adjustment mechanism comprises a first threaded rod 375 fixed in the threaded bore 265 in the front of the frame body 215, and a second threaded rod 379 fixed in a threaded bore 381 in the base 317a of the hook 317. The first and second rods 375, 379 have opposite threading (right-hand and left-hand) and engage a threaded nut body 377 at opposed ends. The nut body 377 is internally threaded with right-hand threads on one side and left-hand threads on the other side. As the nut body 377 is rotated, for example, using the tool-receiving aperture 383, the length of the turnbuckle changes, which adjusts the distance of the hook from the frame body 215.

Figure 20:
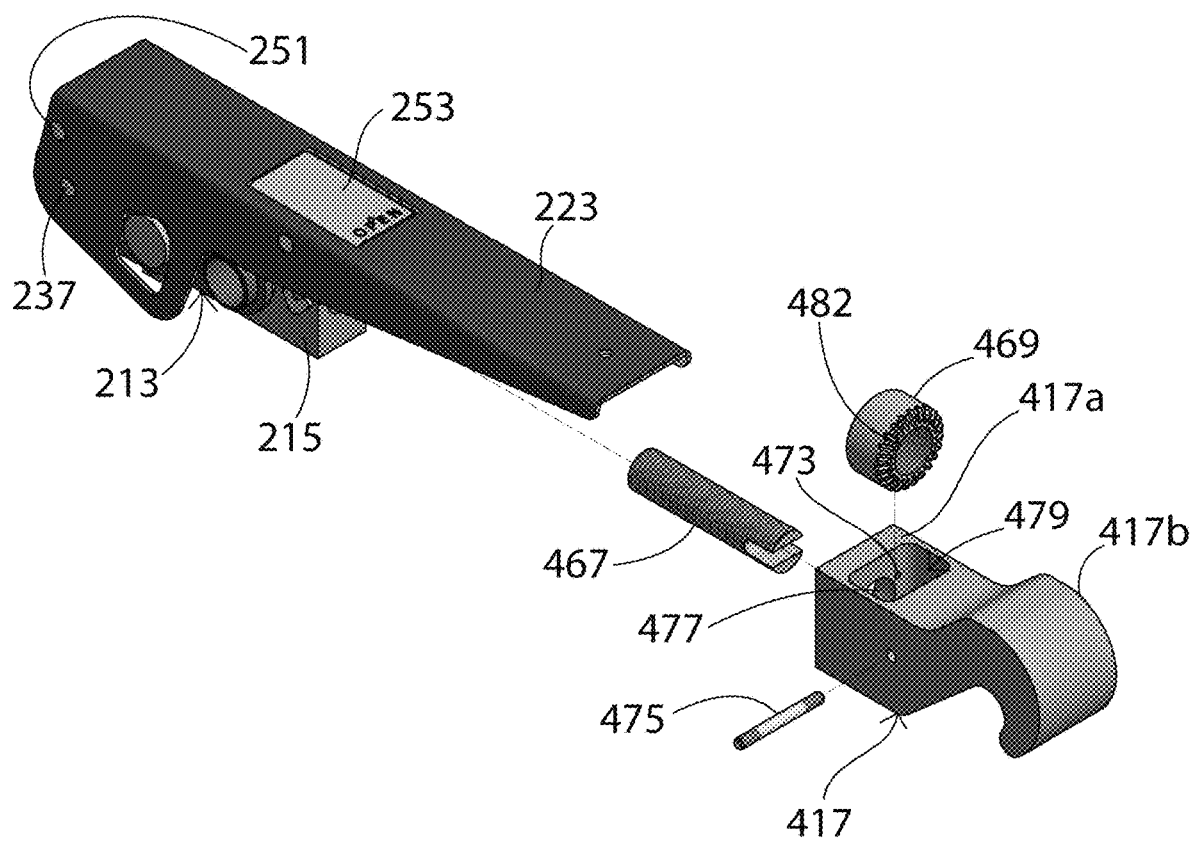
FIG. 20 is a top perspective and partial exploded assembly view of the hook and throw adjustment mechanism in accordance with yet a further preferred embodiment of the invention.
Figure 21:
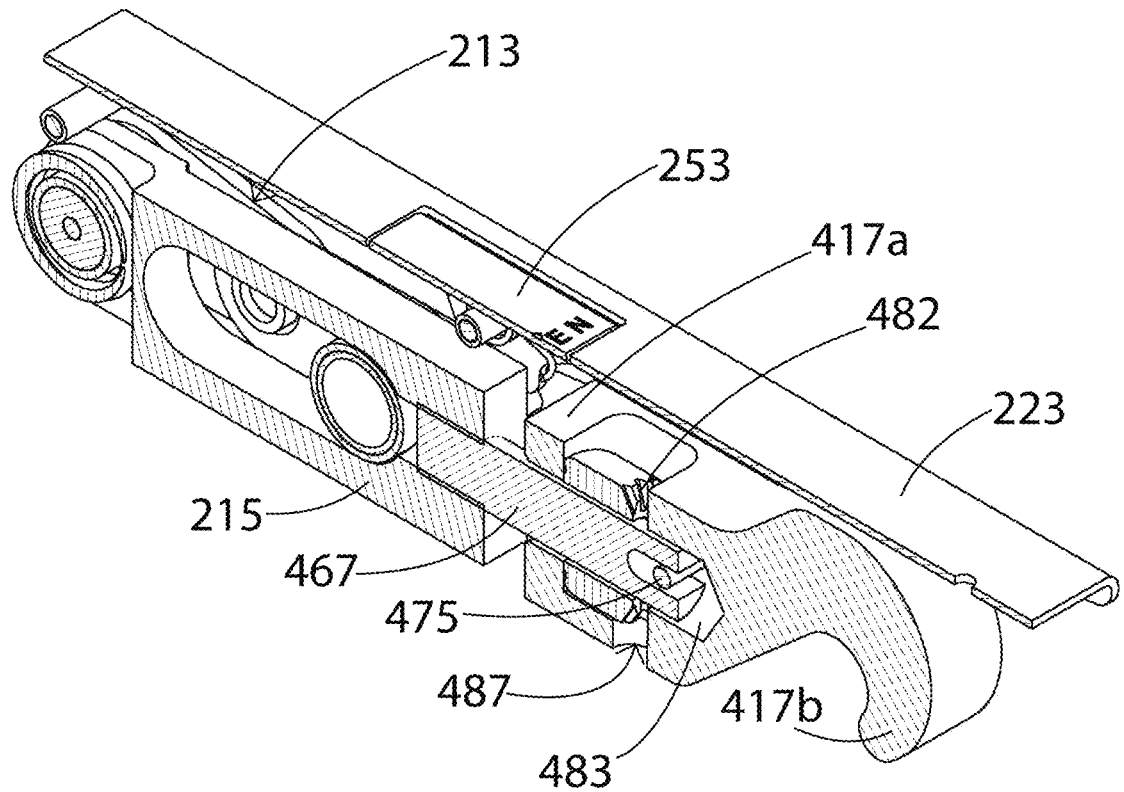
FIG. 21 is a sectional perspective view of the latch of FIG. 20.

An additional embodiment of the invention having a geared throw-adjustment mechanism is shown in FIGS. 20-21. In this embodiment, the handle, toggle linkage and frame body of the latch 411 also have the same construction as the latch 211 shown in FIGS. 12-17. Moreover, the geared throw-adjustment mechanism of this embodiment has the same construction has the throw-adjustment mechanism of FIGS. 12-17 except as described below with respect to the adjustment nut 469.

Figure 22:
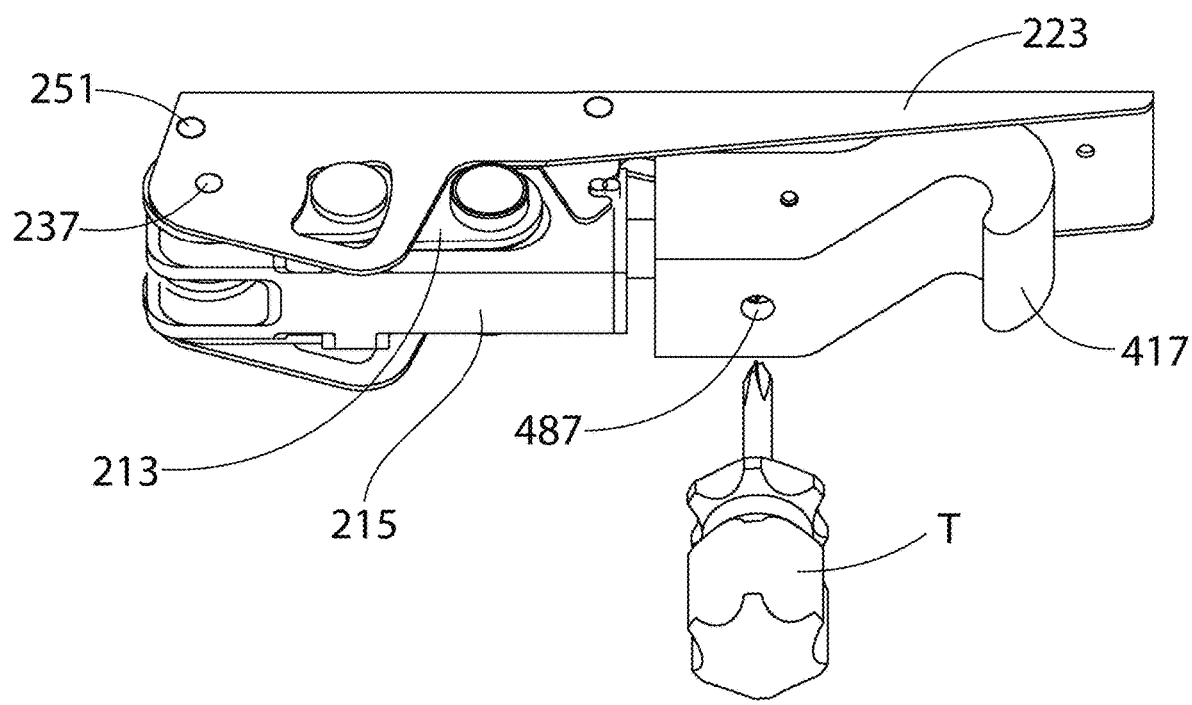
FIG. 22 is a bottom perspective of the latch of FIG. 20 and a tool "T" for adjusting the throw of the hook.

In the embodiment shown in FIGS. 20-22, the geared throw-adjustment mechanism is also constructed and arranged primarily outside of the frame body. The geared throw-adjustment mechanism comprises a threaded rod 467 that engages a threaded nut 469, which sits in a socket 479 in the base of the hook 417. The back end of the threaded rod 467 is threaded into and fixed in a threaded bore 265 in the front end of the frame body 215 and extends generally coaxially therewith. The front end of the threaded rod 467 has a radial slit 467a and extends through an aperture 477 in the base 417a of the hook 417 and sits in a bore 483 in the end of the base 417a that has shape that complements the shape of the rod 467. The cavity also has a pin 475 that traverses the cavity. The pin 475 is slightly smaller than the slit 467a so that the rod 467 can translate axially within the socket 479 even when the slitted end of the rod is installed over the pin 475; however, in this configuration, the pin prevents the threaded rod 467 from rotating within the socket. The adjustment nut 469 is threaded onto the rod 467 and is seated in the socket 479 in the base 417a of the hook 417.

In contrast with the adjustment nut 269 of FIGS. 12-17, in this preferred embodiment, the nut 469 includes a plurality of radially-extending gears 482 in the front face instead of the radial bores 281 for rotating the nut. A wave spring (not shown) surrounds the rod 467 and is also seated in the socket 479 in abutment with the front, geared face of the adjustment nut 469. Referring to FIG. 22, in this embodiment, the nut 469 is rotated by inserting a tool "T" having a geared head, such as a Phillips head screwdriver, through an aperture in the bottom of the hook base and rotating the tool "T". As the nut 469 rotates, the throw of the hook 217 either increases of decreases depending on the direction of rotation of the nut 469.

The latch 411 includes the same means for releasably locking the adjustment nut 469 in a desired angular location as described above with respect to the embodiment shown in FIGS. 12-17. A detent pin 473 extends through the wall of the base of the hook 417 and protrudes into engagement with the back face of the adjustment nut 469, which includes a plurality of engagement features (not shown) machined into the back face of the adjustment nut 469. As the adjustment nut 469 is rotated, the detent pin 473 sequentially engages and disengages the concavities until the nut is positioned in the desired angular location. The detent pin 473 and mating concavity prevent the nut 469 from inadvertently loosening from that desired angular location.

The foregoing drawings and descriptions are to be considered illustrative only of the principles and possible embodiments of the invention. Further, since numerous modifications and changes will readily occur to those skilled in the art, it is not desired to limit the invention to the exact constructions and operations shown and described. Accordingly, suitable modifications and equivalents may be resorted to, all falling within the scope of the invention, which shall be determined only by the following claims and their legal equivalents.

The invention claimed is:
1. A latch comprising:
   a tension mechanism including a frame body and a mounting pin that extends through the frame body, the mounting pin couplable to a first structural element;
   a hook coupled to the frame body and configured to engage a second structural element;
   a handle coupled to the tension mechanism and configured to move the tension mechanism between a first position and a second position with respect to the second structural element when the mounting pin is coupled to the first structural element and the first structural element is static;

a toggle linkage that couples the frame body to the handle, the toggle linkage including two or more links and having an over-center configuration where each of the two or more links has a major axis that is parallel with a major axis of the frame body in the first position; and an adjuster configured to adjust a distance between the hook and the mounting pin when the tension mechanism is in the first position.

2. The latch recited in claim 1, wherein the latch further includes:

a connection rod assembly that couples the hook to the frame body, the adjuster being configured to adjust an axial length of the connection rod assembly.

3. The latch recited in claim 2, wherein the connection rod assembly includes a threaded rod fixed to and extending axially from the frame body, and the and hook is couplable to the threaded rod at different locations along the threaded rod.

4. The latch recited in claim 2, wherein the connection rod assembly includes a turnbuckle including a first threaded rod extending axially from the frame body, a second threaded rod extending axially from the hook, and a threaded turnbuckle body connecting the first and second threaded rods to one another.

5. The latch recited in claim 4, wherein the first threaded rod is received by a threaded bore of the frame body and the second threaded rod is received by a threaded bore of the hook.

6. The latch recited in claim 5, wherein one of the first threaded rod and the second threaded rod includes left-hand threading, the other of the first threaded rod and the second threaded rod includes right-hand threading, and the turnbuckle body includes both left-handed and right-handed threading.

7. The latch of claim 4, wherein said turnbuckle body locks at a fixed location on the first threaded rod.

8. The latch recited in claim 3, wherein the hook is couplable to the threaded rod at a first connection, the first connection comprising an adjustment nut threadedly engaged with the threaded rod and seated in a socket of the hook.

9. The latch recited in claim 8, wherein the hook has a first end and a second end, the first end including a mouth that engages the second structural element, the second end including the socket, and the hook including an unthreaded axial bore that extends from the socket toward the mouth.

10. The latch recited in claim 9, wherein the threaded rod extends through the adjustment nut and into the unthreaded axial bore.

11. The latch recited in claim 10, wherein an end of the threaded rod that extends through the unthreaded axial bore and into the adjustment nut includes a radially-extending slit that engages an anti-rotation pin fixed in and traversing the unthreaded axial bore to prevent rotational movement of the hook relative to the threaded rod.

12. The latch of claim 11, wherein the slot has a depth and the anti-rotation pin has a diameter that permits axial movement of the threaded rod within the unthreaded axial bore without the slot disengaging from the anti-rotation pin.

13. The latch recited in claim 8, wherein the adjustment nut includes a detent that resists rotation of the adjustment nut on the threaded rod.

14. The latch recited in claim 8, wherein the adjustment nut includes a bore configured to be engaged by a torque-application tool.

15. The latch recited in claim 8, wherein the adjustment nut includes two or more bores equally spaced in the periphery of the adjustment nut, each of the two or more bores configured to be engaged by a torque-application tool.

16. The latch recited in claim 8, wherein a periphery of the adjustment nut includes a plurality of teeth to engage a torque-application tool.

17. The latch of claim 4, wherein said turnbuckle body locks at a fixed location on the second threaded rod.

18. The latch of claim 1, wherein the adjuster is disposed within a body of the hook.

19. A latch comprising:

a tension mechanism including a frame body and a mounting pin that extends through the frame body, the mounting pin couplable to a first structural element;

a hook coupled to the frame body and configured to engage a second structural element; and a connection rod assembly that couples the hook to the frame body, an axial length of the connection rod being adjustable to change a distance between the hook and the mounting pin, the connection rod assembly including:

a first threaded rod extending axially from the frame body;

a second threaded rod extending axially from the hook; and a threaded turnbuckle body connecting the first and second threaded rods to one another.

20. A latch comprising:

a tension mechanism including a frame body and a mounting pin that extends through the frame body, the mounting pin couplable to a first structural element;

a hook coupled to the frame body and having a mouth configured to engage a second structural element;

a connection rod assembly that couples the hook to the frame body, an axial length of the connection rod being adjustable to change a distance between the hook and the mounting pin the connection rod assembly including:

a threaded rod having a first end and a second end, the first end of the threaded rod fixed to and extending axially from the frame body, the second end of the threaded rod having a radially-extending slit; and an adjustment nut threadably engaged with the threaded rod and seated in a socket of the hook, the second end of the threaded rod extending through the adjustment nut and into an unthreaded axial bore defined by the hook, the radially-extending slit engaging an anti-rotation pin fixed in and traversing the unthreaded axial bore to prevent rotational movement of the hook relative to the threaded rod.

* * * * *